(12) United States Patent
Urushiyama et al.

(10) Patent No.: US 7,195,305 B2
(45) Date of Patent: Mar. 27, 2007

(54) APPARATUS FOR ADJUSTING RIGIDITY OF VEHICLE BODY

(75) Inventors: Yuta Urushiyama, Utsunomiya (JP); Shunji Suzuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 11/134,895

(22) Filed: May 23, 2005

(65) Prior Publication Data

US 2005/0264037 A1   Dec. 1, 2005

(30) Foreign Application Priority Data

May 27, 2004  (JP)  .............................. 2004-157694
Apr. 8, 2005  (JP)  .............................. 2005-112479

(51) Int. Cl.
*B60J 7/00*  (2006.01)
(52) U.S. Cl. .................................. 296/187.03; 293/133
(58) Field of Classification Search .......... 296/187.03, 296/187.09, 187.11, 187.12; 293/133, 120
See application file for complete search history.

(56) References Cited

U.S. PATENT DOCUMENTS

| | | | | |
|---|---|---|---|---|
| 3,930,665 | A * | 1/1976 | Ikawa | .......................... 293/133 |
| 3,938,841 | A * | 2/1976 | Glance et al. | ............... 293/120 |
| 4,221,413 | A * | 9/1980 | Bonnetain | .................... 293/122 |
| 4,312,430 | A * | 1/1982 | Ohtani | ......................... 188/377 |
| 5,518,802 | A * | 5/1996 | Colvin et al. | ................. 428/178 |
| 6,286,895 | B1 | 9/2001 | Uroshiyama et al. | |
| 6,290,272 | B1 * | 9/2001 | Braun | .................... 296/187.04 |
| 6,334,638 | B1 * | 1/2002 | Yamamuro et al. | ......... 293/133 |
| 6,991,282 | B2 * | 1/2006 | Suzuki et al. | .......... 296/187.03 |
| 7,090,288 | B2 * | 8/2006 | Suzuki et al. | .......... 296/187.09 |
| 7,131,674 | B2 * | 11/2006 | Evans et al. | ................. 293/133 |
| 2003/0090127 | A1 | 5/2003 | Sacki | |
| 2005/0088010 | A1 | 4/2005 | Suzuki et al. | |

FOREIGN PATENT DOCUMENTS

| | | |
|---|---|---|
| EP | 1 498 343 A2 | 1/2005 |
| JP | 11-291951 | 10/1999 |
| JP | 2001-504413 | 4/2001 |

OTHER PUBLICATIONS

Patent Abstracts of Japan, Bumper for Car, Publication No. 59118548, Publication Date: Sep. 7, 1984.

* cited by examiner

*Primary Examiner*—Kiran B. Patel
(74) *Attorney, Agent, or Firm*—Rankin, Hill, Porter & Clark LLP

(57) ABSTRACT

An apparatus for adjusting the rigidity of vehicle body can appropriately control the rigidity of a vehicle body.

An apparatus for varying rigidity includes a plurality of (e.g. three) plate-like members comprising shape-memory alloy, and a plurality of (e.g. two) connecting-disconnecting members that are detachably connected to the plate-like members. Each connecting-disconnecting member includes a base member that detachably connects to the plurality of plate-like members via a connecting member fitted to each plate-like member, a plurality of pairs of pin guides and movable pin members that are fitted to the base member, and a plurality of (e.g. two) actuators that are controlled by an unillustrated controller.

11 Claims, 18 Drawing Sheets

122 (A)

122 (B)

APPARATUS FOR ADJUSTING RIGIDITY OF VEHICLE BODY

BACKGROUND OF THE INVENTION

1. Field of the Invention

This invention relates to an apparatus for adjusting the rigidity of vehicle body that controls the rigidity of a frame and the like of a vehicle body so as to appropriately absorb collision energy in accordance with a collision form and a colliding subject.

Priority is claimed on Japanese Patent Application Nos. 2004-157694, filed May 27, 2004, and 2005-112479, filed Apr. 8, 2005, the contents of which are incorporated herein by reference.

2. Description of Related Art

There is a conventional apparatus for adjusting the rigidity of vehicle body that controls the rigidity of the vehicle body by using piezoelectric actuators, which are placed on side frames attached to left and right sides of the vehicle, to apply a force that resists or promotes a collision load received from the front of the vehicle to the side frames, thereby switching the rigidity of the side frames in order to deal with different forms of collision (e.g. see Japanese Unexamined Patent Application, First Publication, No. H11-291951). Specifically, the structure of this apparatus reduces the rigidity of the side frames in a full lap collision against the entire front face of the vehicle body, and increases the rigidity of the side frame in an offset collision where the collision load is focused on one side frame.

Another conventional apparatus determines whether there is a collision based on, for example, results detected by acceleration sensors and the like, and, when there is a collision, expedites deformation of a front bumper beam, reducing the rigidity of the front bumper beam by allowing part of it to break (e.g. see Published Japanese Translation No. 2001-504413 of the PCT International Publication).

However, the above-described conventional apparatus for adjusting the rigidity of vehicle body requires a large amount of electric power to actuate the piezoelectric actuators, due to the generation in the piezoelectric actuators of the force that resists the collision load (i.e. the force that directly receives the collision load). A disadvantage of this is that the piezoelectric actuators themselves become larger, as does a battery that supplies power to them.

The conventional apparatus that allows part of the beam to break merely reduces the rigidity of the beam to a predetermined level whenever there is a collision, and cannot appropriately modify its rigidity in accordance with the level of the collision and the subject that it collides with.

SUMMARY OF THE INVENTION

This invention has been realized in view of the circumstances mentioned above, and aims to provide an apparatus for adjusting the rigidity of vehicle body that can appropriately control the rigidity of the vehicle body.

To achieve the above objects, an apparatus for adjusting the rigidity of vehicle body according to a first aspect of this invention (e.g. apparatus for varying rigidity 22 in the embodiments) includes a plurality of plate-like members (e.g. plate-like members 31 in the embodiments) that a collision load is applied to, the plate-like members being arranged substantially parallel to the direction of the collision load, and connecting-disconnecting members (e.g. connecting-disconnecting members 32 in the embodiments) that are provided at predetermined positions of each of the plurality of plate-like members and are detachably connected thereto.

According to the apparatus for adjusting the rigidity of vehicle body having the above configuration, the rigidity of the apparatus for varying rigidity can be easily modified by detachably connecting the connecting-disconnecting members to the plurality of plate-like members at predetermined positions thereof.

In the apparatus for adjusting the rigidity of vehicle body according to a second aspect of this invention, connecting members (e.g. connecting member 42) are fitted to the plate-like members (e.g. plate-like members 31 in the embodiments) and detachably connect them to the connecting-disconnecting members (e.g. the connecting-disconnecting members 32 in the embodiments)

According to the apparatus for adjusting the rigidity of vehicle body having the above configuration, the connecting members enable the plate-like members to be detachably connected to the connecting-disconnecting members without performing considerable work to the plate-like members.

In the apparatus for adjusting the rigidity of vehicle body according to a third aspect of this invention, movable pin members (e.g. movable pin members 45 in the embodiments) are fitted to the connecting-disconnecting members (e.g. connecting-disconnecting members 32 in the embodiments), and insertion holes (e.g. insertion holes 42b in the embodiments) that enable insertion of the movable pin members are provided in the connecting members attached (e.g. connecting members 42 in the embodiments) to the plate-like members.

According to the apparatus for adjusting the rigidity of vehicle body having the above configuration, the plate-like members can be detachably connected to the connecting-disconnecting members by inserting/drawing the movable pin members into/through the insertion holes.

Moreover, in the apparatus for adjusting the rigidity of vehicle body according to a fourth aspect of this invention, each connecting-disconnecting member (e.g. connecting-disconnecting member 32 in the embodiments) includes the movable pin member (movable pin member 45), an actuator (e.g. actuator 46 in the embodiments) that drives the movable pin member, and a base member (e.g. base member 43 in the embodiments) for mounting the movable pin member and the actuator.

According to the apparatus for adjusting the rigidity of vehicle body having the above configuration, since the connecting-disconnecting member includes the base member, the actuator, and the movable pin member that is driven by the base member, the configuration of the apparatus can be simplified and the number of components can be reduced.

In the apparatus for adjusting the rigidity of vehicle body according to a fifth aspect of this invention, the movable pin members (e.g. movable pin members 45 in the embodiments) of the connecting-disconnecting members (e.g. connecting-disconnecting members 132 in the embodiments) can rotate with respect to the insertion holes (e.g. insertion holes 142b in the embodiments) in the connecting members (e.g. connecting members 142) when inserted therein.

According to the apparatus for adjusting the rigidity of vehicle body having the above configuration, the plate-like members can be permitted to rotate with respect to the connecting-disconnecting members when the plate-like members deform. Furthermore, since the plate-like members generate no bend moment, bending deformation of the connecting-disconnecting members can be prevented.

The apparatus for adjusting the rigidity of vehicle body according to a sixth aspect of this invention further comprises a supporting piece (e.g. supporting piece 140 in the embodiments) that is provided between the connecting-disconnecting member and the connecting member, and, when the movable pin member is not inserted into the insertion hole in the connecting member, provisionally holds the connecting-disconnecting member against the connecting member in a state that permits the connecting member to rotate with respect to the connecting-disconnecting member.

According to the apparatus for adjusting the rigidity of vehicle body having the above configuration, when the movable pin member is not inserted into the insertion hole in the connecting member, the supporting piece provisionally holds the connecting-disconnecting member against the connecting member, preventing it from becoming detached.

In the apparatus for adjusting the rigidity of vehicle body according to a seventh aspect of this invention, each end of the plurality of plate-like members (e.g. plate-like members 131 in the embodiments) has a supporter (e.g. insertion hole 102c in the embodiments) that rotatably supports it with respect to a vehicle body member (e.g. beam member 21 in the embodiments) with the wide direction of the plate-like member as its axis in order to permit bending deformation toward the out-of-plane direction of the plate-like member.

According to the apparatus for adjusting the rigidity of vehicle body having the above configuration, the ends of the plate-like members are permitted to rotate, whereby it is possible to avoid a high load being generated by bend restraint stiffness of the ends during buckling deformation that is caused by compression of the plate-like member.

In the apparatus for adjusting the rigidity of vehicle body according to an eighth aspect of this invention, the supporter is offset from the plate-like member and faces in a direction parallel to the out-of-plane direction of the plate-like member.

According to the apparatus for adjusting the rigidity of vehicle body having the above configuration, the input point of the collision load is deviated from the positions of the plate-like member, whereby a reasonable bend moment can be applied to the plate-like member at the time of its initial deformation.

The apparatus for adjusting the rigidity of vehicle body according to a ninth aspect of this invention further comprises brackets (e.g. brackets 100 in the embodiments) that are provided on both sides of each plate-like member and restrict at least adjacent plate-like members at their respective supporters. Each bracket is fitted with an attachment unit (e.g. attachment hole 101 in the embodiments) for attaching to the vehicle member.

According to the apparatus for adjusting the rigidity of vehicle body having the above configuration, the apparatus can be attached to the vehicle member via the brackets.

The apparatus for adjusting the rigidity of vehicle body according to a tenth aspect of this invention further comprises a stopper (e.g. stopper 102 in the embodiments) that is fitted to at least one of the brackets provided on both sides of each plate-like member, and, when the plate-like member deforms in the buckling direction, directly contacts the other bracket and restricts the brackets from moving nearer to each other.

According to the apparatus for adjusting the rigidity of vehicle body having the above configuration, even when the load is so large that the plate-like member will exceed its maximum warping and break, the stoppers of the brackets can prevent this.

The apparatus for adjusting the rigidity of vehicle body according to an eleventh aspect of this invention further comprises a protrusion (e.g. protrusion 108 in the embodiments) that is formed on at least one of the brackets and protrudes to the vehicle member side, it being possible to attach the bracket to the vehicle member when the protrusion is stored in a hole (e.g. rectangular hole 21a in the embodiments) formed at a corresponding position in the vehicle member.

According to the apparatus for adjusting the rigidity of vehicle body having the above configuration, ends of the plate-like members can be prevented from being exposed to the outside by storing them in the holes.

In the apparatus for adjusting the rigidity of vehicle body according to a twelfth aspect of this invention, the plate-like members (e.g. plate-like members 31 in the embodiments) are made from a shape-memory alloy.

According to the apparatus for adjusting the rigidity of vehicle body having the above configuration, collision energy input from the outside can be absorbed appropriately.

The "shape-memory alloy" mentioned here is, for example, a Ti—Ni alloy, characterized in that its buckling load and warp energy values vary greatly according to its length in comparison with aluminum alloy or iron-type materials. Specifically, when the length of a shape-memory alloy is greater than a predetermined value, its buckling load reaches its peak and thereafter decreases when it buckles, in the same manner as an aluminum alloy or an iron-type material. However, when the length of the shape-memory alloy is less than a predetermined value, its buckling load increases again after buckling. A shape-memory alloy is a material having a two-stage relationship between stress and warping (decreasing at low stress, plastically deforming with constant warping, and then elastically deforming again whereby stress increases and is followed by a second decrease). Therefore, when its length is less than a predetermined value, the second-stage stress-warping relationship has considerable effect, whereby the buckling load increases.

If this type of shape-memory alloy is used in the present invention, when not contacting predetermined positions of the plate-like members (i.e. when detached), since the section that deforms by buckling is now in its longest state, the plate-like members buckle at small load. When the sections that connect to predetermined positions of the plate-like members and deform by buckling are made shorter than the predetermined value, the buckling load increases again after buckling. Therefore, the plate-like members buckle at a load that is much larger than the small load, making it possible to absorb greater collision energy.

DETAILED DESCRIPTION OF THE INVENTION

Embodiments of this invention will be explained with reference to the drawings.

An apparatus for adjusting the rigidity of vehicle body according to a first embodiment of this invention will be explained with reference to the accompanying drawings.

Figure 1:
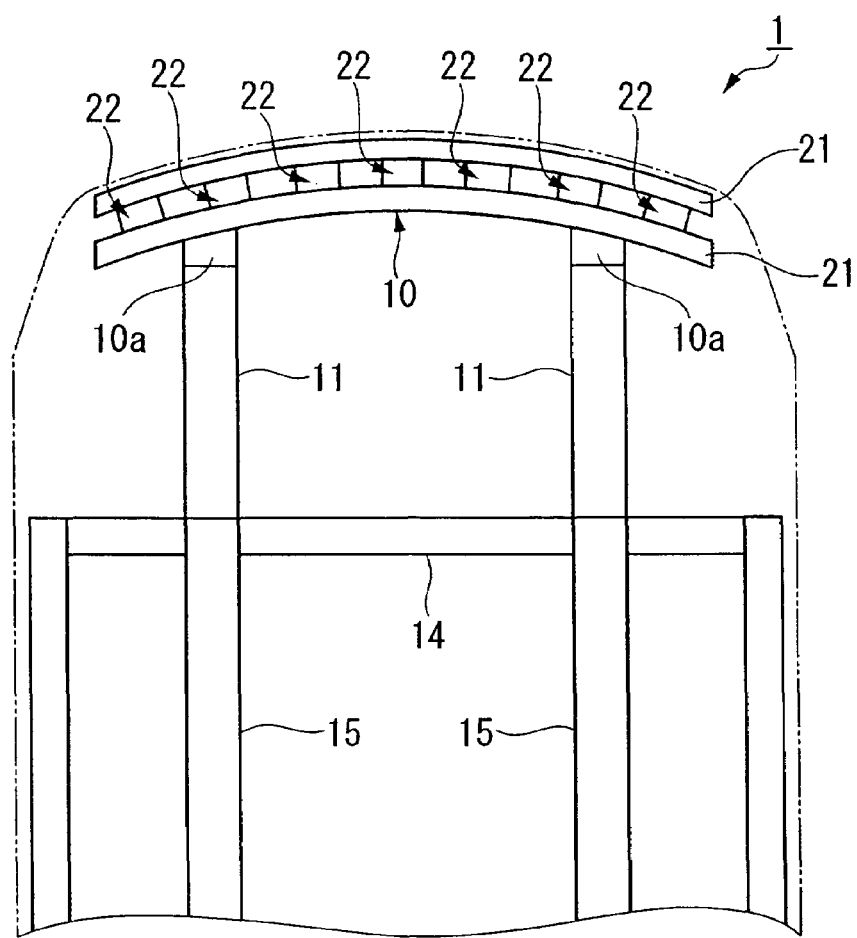
FIG. 1 is a diagram of the structure of a vehicle body front part according to first to third embodiments of this invention.

The apparatus for adjusting the rigidity of vehicle body according to an embodiment of this invention controls changes in the rigidity of components that constitute, for example, a vehicle body beam. As shown in FIG. 1, the vehicle body beam includes a front bumper beam 10 that is fitted to a vehicle body front section 1. A pair of front side frames 11 constitute vehicle body framework members, and are attached to the vehicle body front section 1 along its front-rear direction with a gap between them in its wide direction. Front ends of the pair of front side frames 11 and 11 are connected via connecting members 10a such as brackets to the front bumper beam 10 along the vehicle wide direction, and their base ends intersect with a dashboard lower cross member 14, that constitutes a vehicle body framework member along the vehicle width direction, and individually connect to floor frames 15, that constitute vehicle body framework members along the vehicle front-rear direction.

Figure 2:
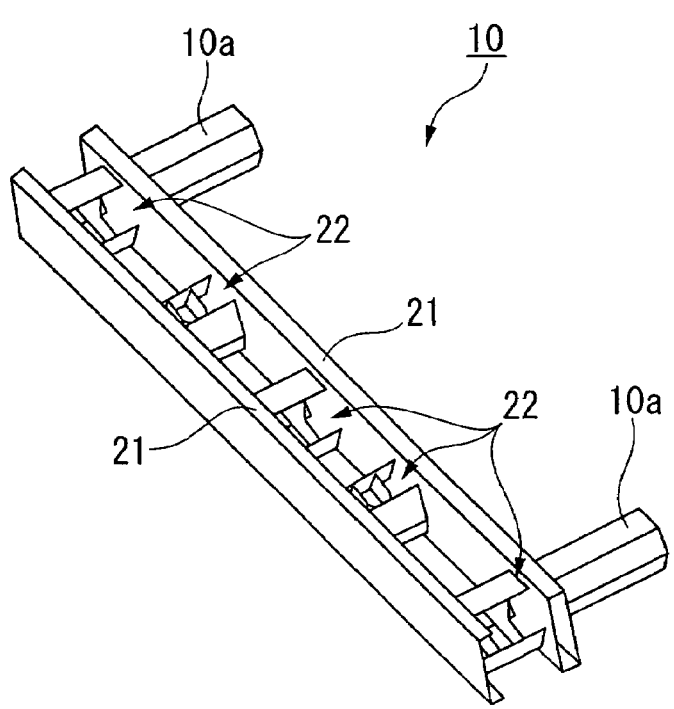
FIG. 2 is a perspective view of a front bumper beam according to the first to third embodiments of this invention.

The apparatus for adjusting the rigidity of vehicle body according to this embodiment is fitted with the front bumper beam 10 and an unillustrated controller that drive-controls actuators 46 explained later. As shown in FIG. 2, the front bumper beam 10 includes a pair of plate-like beam members (vehicle body members) 21 and 21 that are arranged facing each other in the vehicle front-rear direction, and a plurality of apparatuses for varying rigidity 22, ..., 22 that are connected so as to be enclosed from each side by the pair of beam members 21 and 21 in the vehicle front-rear direction.

The plurality of apparatuses for varying rigidity 22, ..., 22 are arranged substantially parallel to the direction of a collision load. When the vehicle collides with a subject, the collision load is applied to the plurality of apparatuses for varying rigidity 22, ..., 22 from the beam members 21 at the front of the vehicle body, and they absorb the collision energy.

Figure 3:
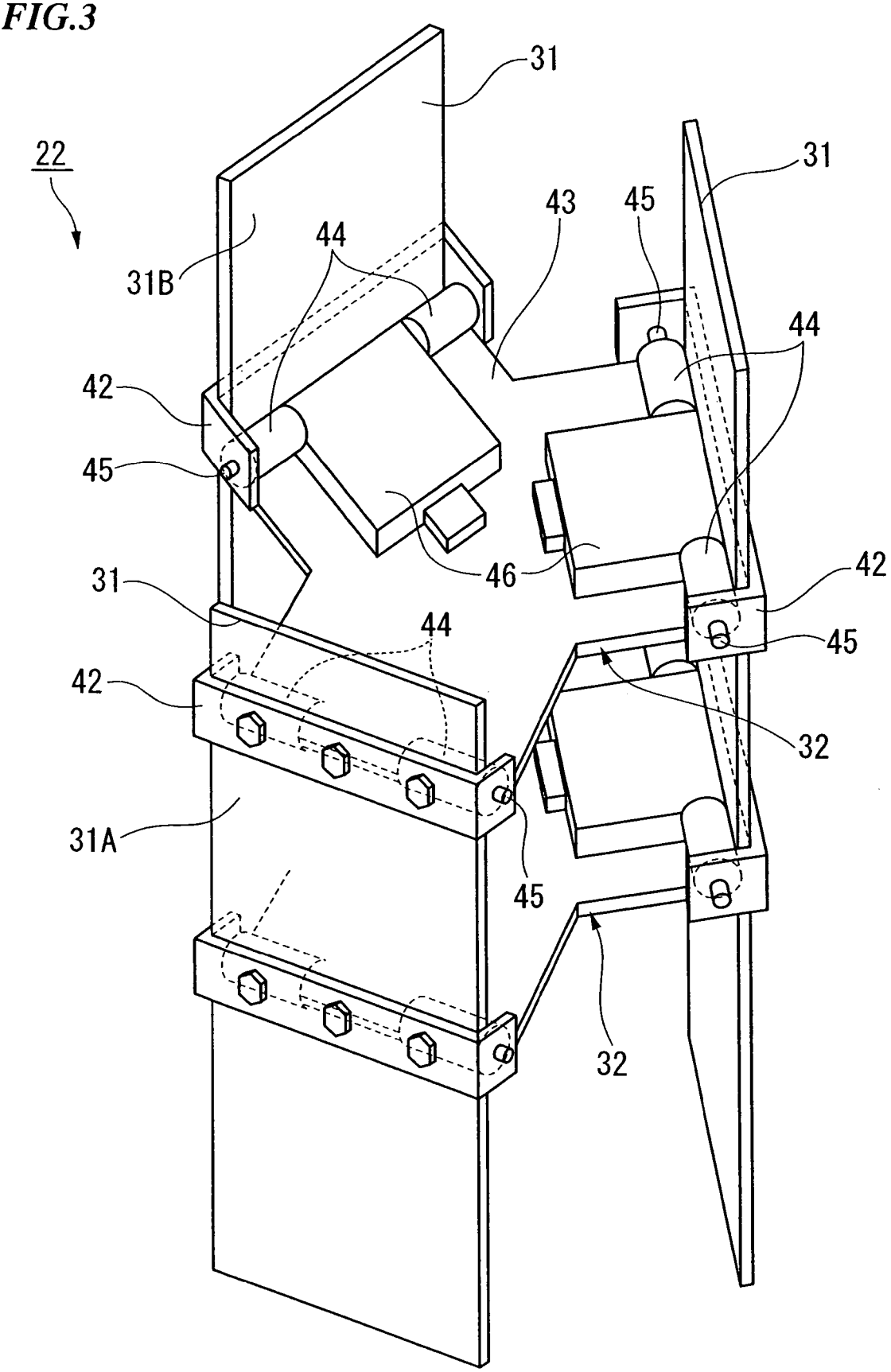
FIG. 3 is a perspective view of an apparatus for varying rigidity according to the first embodiment of this invention.
Figure 4:
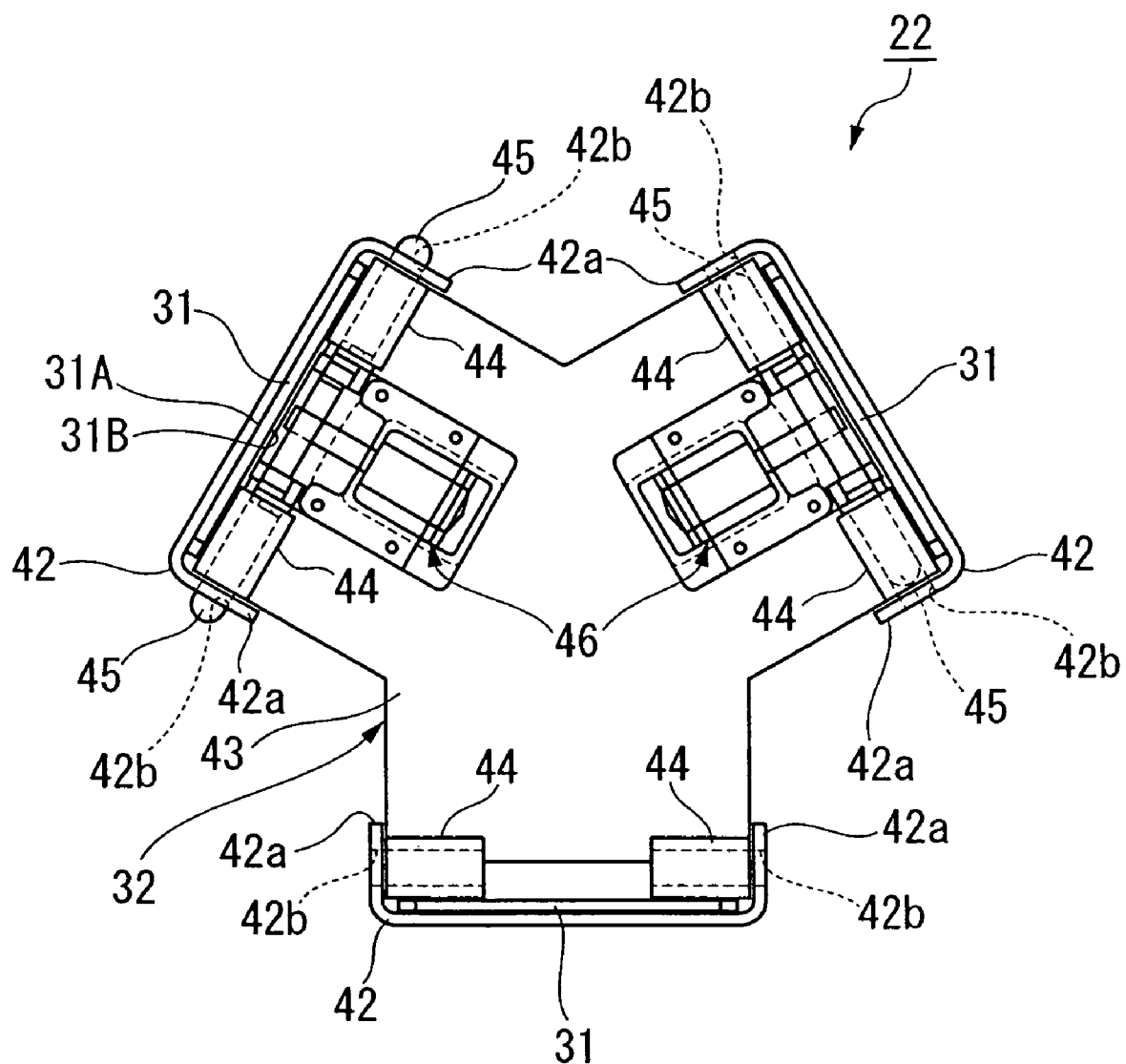
FIG. 4 is a plan view of the apparatus for varying rigidity shown in FIG. 3.

As shown in FIGS. 3 and 4, each apparatus for varying rigidity 22 includes a plurality of (e.g. three) plate-like members 31, 31, and 31 that are made from a shape-memory alloy and function as shock absorbing members, the plate-like members 31 being arranged so as to enclose the pair of beam members 21 and 21 from each side in the vehicle front-rear direction, and a plurality of (e.g. two) connecting-disconnecting members 32 and 32 that are detachably connected to the plate-like members 31, the connecting-disconnecting members 32 being provided at predetermined positions along the longitudinal direction of respective plate-like members 31. Each connecting-disconnecting member 32 includes a base member 43 that connects to the plurality of plate-like members 31 via a connecting member 42 fitted to each plate-like member 31 and can be disconnected from the plate-like member 31, a plurality of pairs of pin guides 44, ..., 44 and movable pin members 45, ..., 45 fitted to the base member 43, and a plurality of (e.g. two) actuators 46 and 46 that are controlled by an unillustrated controller.

A connecting member 42 is fitted to each of the plate-like members 31 and is formed in a plate-like shape such that, for example, both ends 42a and 42a curve in the same direction. The connecting members 42 are secured by bolts or the like to top faces 31A of the plate-like members 31, and the curved ends 42a and 42a protrude on the bottom faces 31B of the plate-like members 31.

Insertion holes 42b are formed in the ends 42a of the connecting members 42, enabling movable pin members 45 (explained later) to be inserted.

Figure 5:
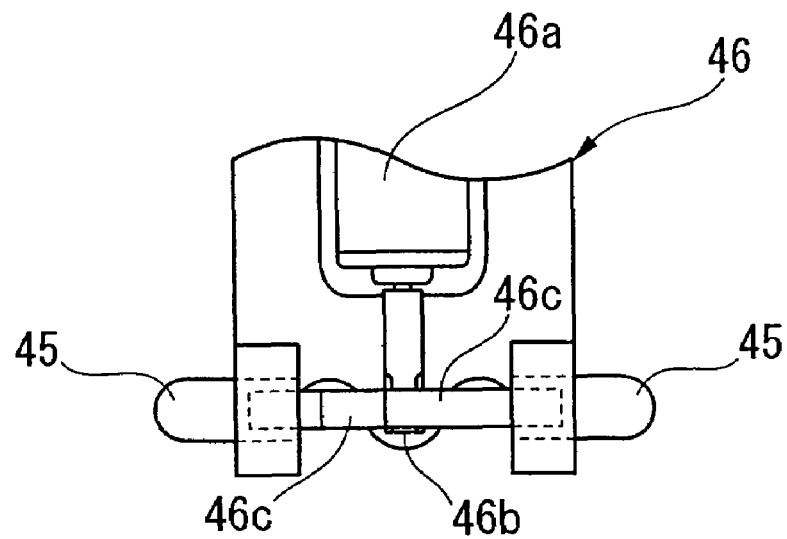
FIG. 5 is a plan view of an actuator shown in FIG. 3.
Figure 6A:
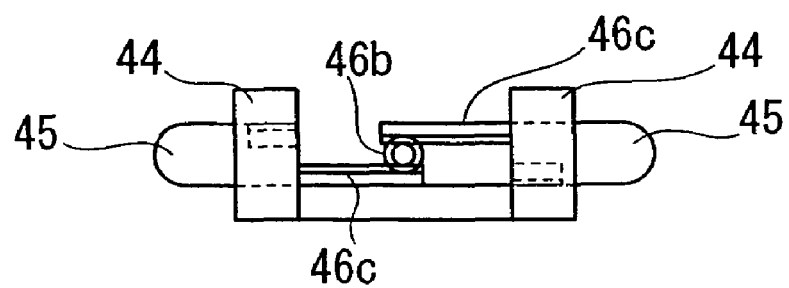
FIGS. 6A and 6B are side views of the actuator shown in FIG. 3.
Figure 6B:
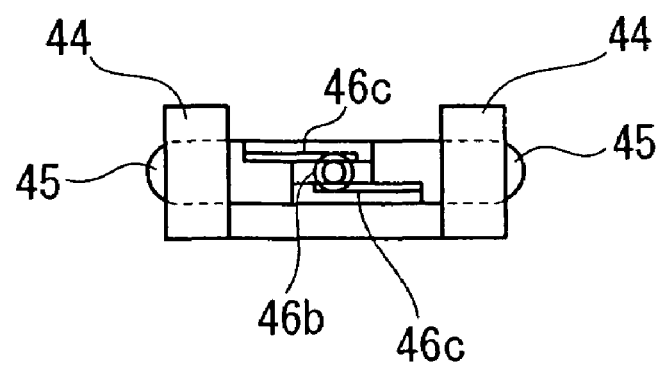

The actuators 46 are driven by, for example, a rack pinion mechanism in which the movable pin members 45 and 45 protrude from the pin guides 44 and 44 to the outside as shown in FIGS. 5 and 6A; alternatively the movable pin members 45 and 45 are buried in the pin guides 44 and 44 as shown in FIGS. 5 and 6B. A pinion 46b connects to a rotational axis of a motor 46a that is drive-controlled by an unillustrated controller, and interlocks with rack-teeth of rack axes 46c and 46c, whereby a rotational motion input from the motor 46a is converted via the pinion 46b to a forward-backward motion of the rack axes 46c and 46c, and the movable pin members 45 and 45 connected to both ends of the rack axes 46c and 46c are propelled forward along the pin guides 44 and 44.

When the actuator 46 propels the pair of movable pin members 45 and 45 fitted to the base member 43 along the pair of pin guides 44 and 44, the pair of movable pin members 45 and 45 are inserted into, or passed through, the pair of insertion holes 42b and 42b in the connecting member 42 fitted to the plate-like member 31. When the pair of movable pin members 45 and 45 are inserted into the pair of insertion holes 42b and 42b, the plate-like member 31 becomes securely connected to the base member 43. When the pair of movable pin members 45 and 45 are passed through the pair of insertion holes 42b and 42b, the plate-like member 31 becomes disconnected from the base member 43.

A plurality of (e.g. two) connecting-disconnecting members 32 are provided for each plate-like member 31. The deformation state of the plate-like members 31 when the load along their longitudinal direction acts from the end thereof changes in accordance with the combination of the secured states and the disconnected states of the connecting-disconnecting members 32.

Figures 7A, 7B, 7C:
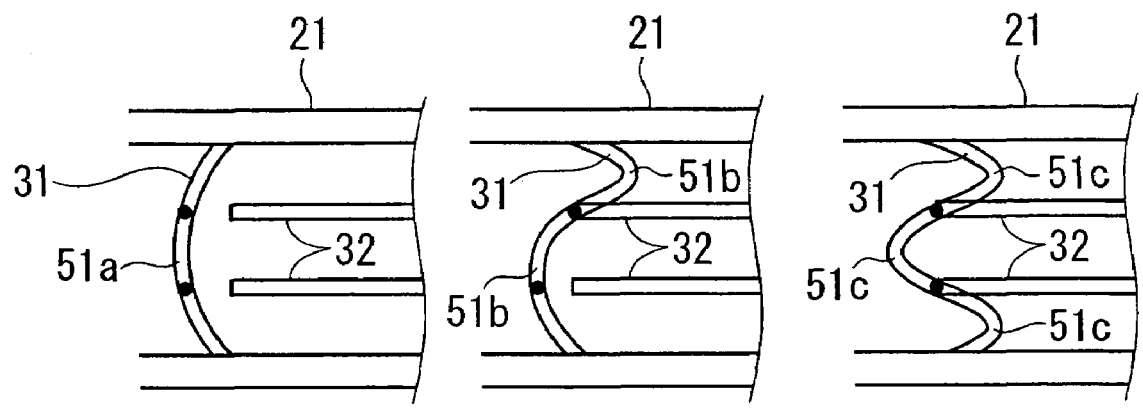
FIGS. 7A to 7C are schematic views of the side face of a plate-like member shown in FIG. 3.

When the two connecting-disconnecting members 32 and 32 are disconnected from the plate-like member 31 as shown in FIG. 7A, the maximum load along the longitudinal direction of the plate-like member 31 decreases by a minimum amount, whereby the plate-like member 31 buckles in primary mode deformation so that it has a single antinode 51a. When one of the two connecting-disconnecting members 32 and 32 is connected to the plate-like member 31 and the other is disconnected as shown in FIG. 7B, the maximum load along the longitudinal direction of the plate-like member 31 increases relatively and the plate-like member 31 buckles in secondary mode deformation so that it has two antinodes 51b and 51b. When both connecting-disconnecting members 32 and 32 are connected to the plate-like member 31 as shown in FIG. 7C, the maximum load along the longitudinal direction of the plate-like member 31 increases by its maximum amount and the plate-like member 31 buckles in tertiary mode deformation so that it has three antinodes 51c, 51c, and 51c.

Figure 8:
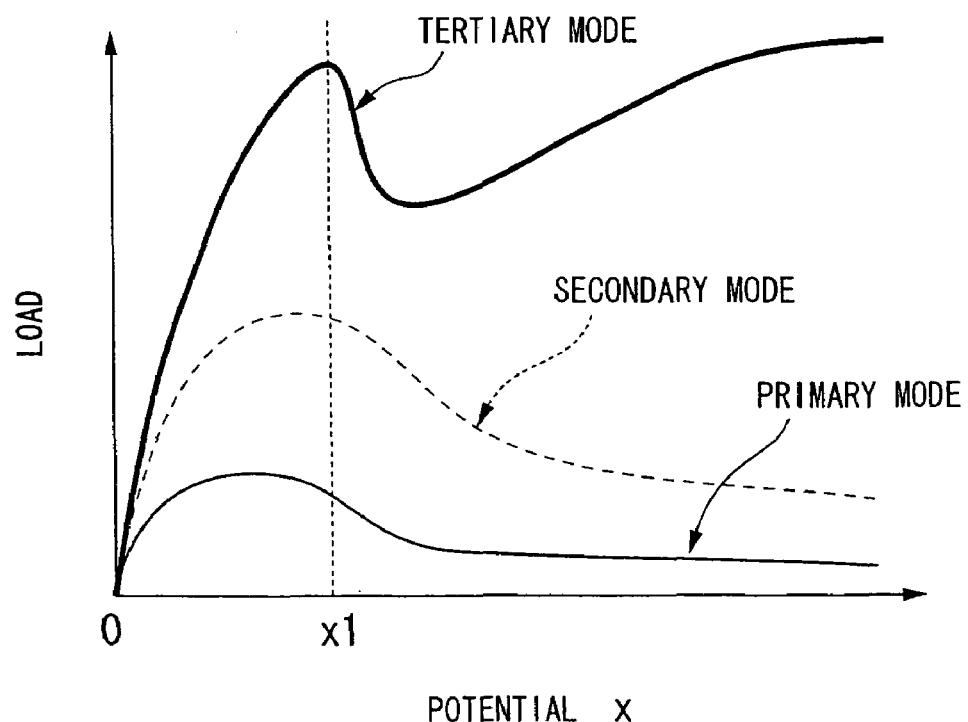
FIG. 8 is a graph of examples of changes in potential with respect to the load of the plate-like member shown in FIG. 3.

As shown in FIG. 8, when the two connecting-disconnecting members 32 and 32 are connected so that the plate-like member 31 made from shape-memory alloy buckles in tertiary mode deformation, the rigidity that provisionally decreases after buckling (e.g. the region of FIG. 8 where the potential is greater than a predetermined potential ×1) changes by tending to increase as the potential × increases.

As described above, the apparatus for adjusting the rigidity of vehicle body of this embodiment can prevent the configuration of the apparatus from becoming complex while appropriately absorbing energy that is input from the outside at the time of collision/contact.

Moreover, the rigidity of the apparatuses for varying rigidity 22 can be set as appropriate in accordance with the degree of collision/contact and the subject that it collides/contacts.

Figure 9:
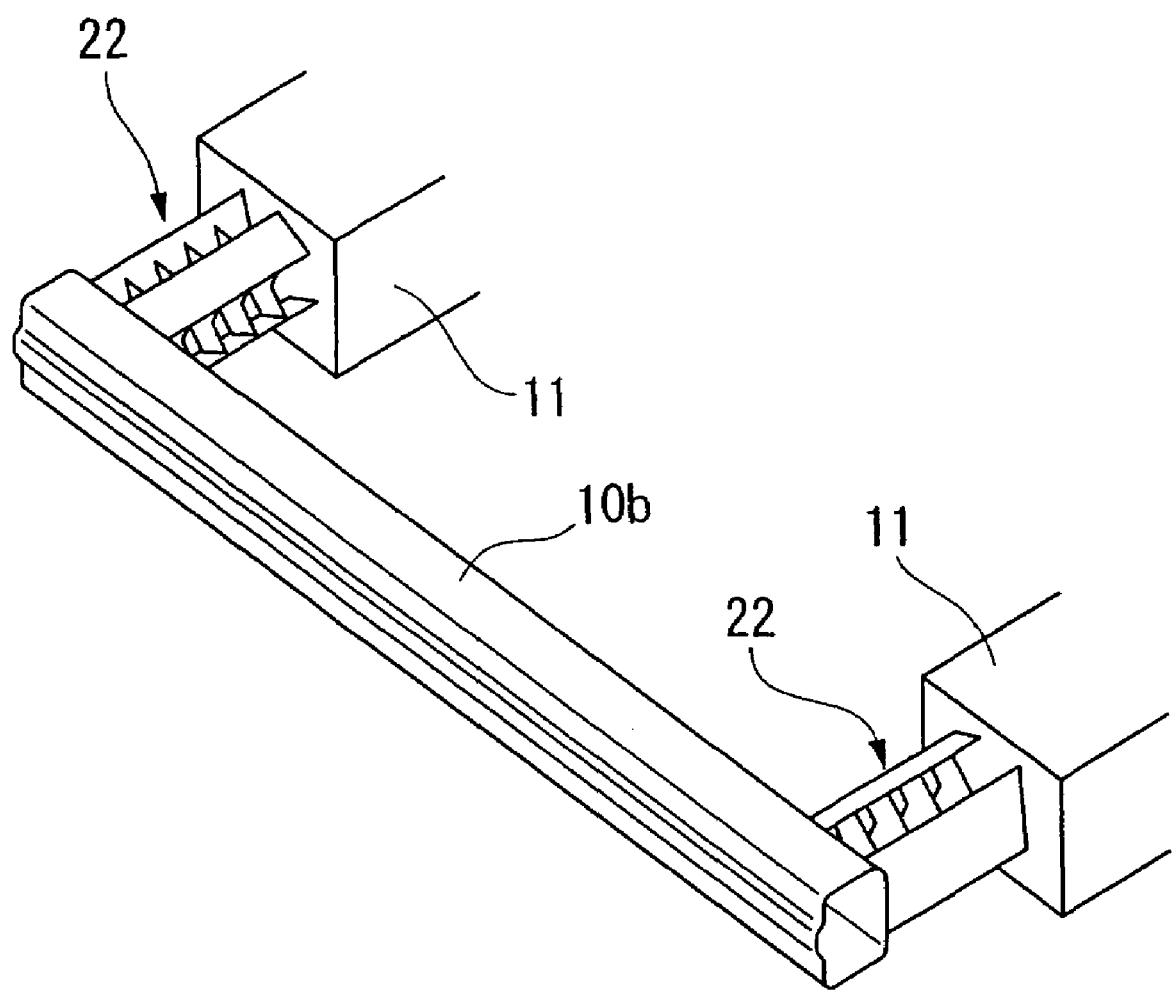
FIG. 9 is a perspective view of a front bumper beam according to the first to third embodiments of this invention.

In the embodiment described above, the plurality of apparatuses for varying rigidity 22, . . . , 22 are enclosed are both sides in the front-rear direction of the vehicle by the beam members 21 and 21. However, the configuration is not limited to this, and the apparatuses for varying rigidity 22 can, for example, be attached as connecting members that connect a hollow cylindrical front bumper beam main body 10b and a pair of front side frames 11 and 11, as shown in FIG. 9. In this case, the ends of each plate-like members 31 connect to the front bumper beam main body 10b and the front side frame 11. In addition, the connecting members 10a in the embodiment described above may be used as an apparatus for varying rigidity 22.

The apparatuses for varying rigidity 22 may be fitted to other parts of the vehicle structure. For example, the apparatuses for varying rigidity 22 can be fitted inside or outside a rear bumper beam along the vehicle width direction to absorb collision energy in the event of a rear face collision. The apparatuses for varying rigidity can be fitted in side sills along the vehicle front-rear direction to absorb collision energy in the event of a side face collision. The ends of the plate-like members 31 may rotatably support the beam members 21 and 21. These deformation examples can also be applied in second and third embodiments described later.

Subsequently, a second embodiment will be explained based on FIGS. 10 to 20 while quoting the first embodiment shown in FIGS. 1 and 2. The second embodiment features another aspect of the apparatus for varying rigidity of the first embodiment. In this embodiment, as in the first embodiment, the apparatus for adjusting the rigidity of vehicle body includes a front bumper beam 10 and an unillustrated controller that drive-controls actuators 146. The front bumper beam 10 includes a pair of plate-like beam members 21 and 21 that are arranged facing each other in the vehicle front-rear direction, and a plurality of apparatuses for varying rigidity 122, . . . , 122 that are connected so as to be enclosed from each side by the pair of beam members 21 and 21 in the vehicle front-rear direction. Since the basic configuration of their constituent parts is the same as that in the first embodiment described above, they are represented by three-digit numerals formed by adding "1" to the front of the reference numeral used earlier.

Figure 10:
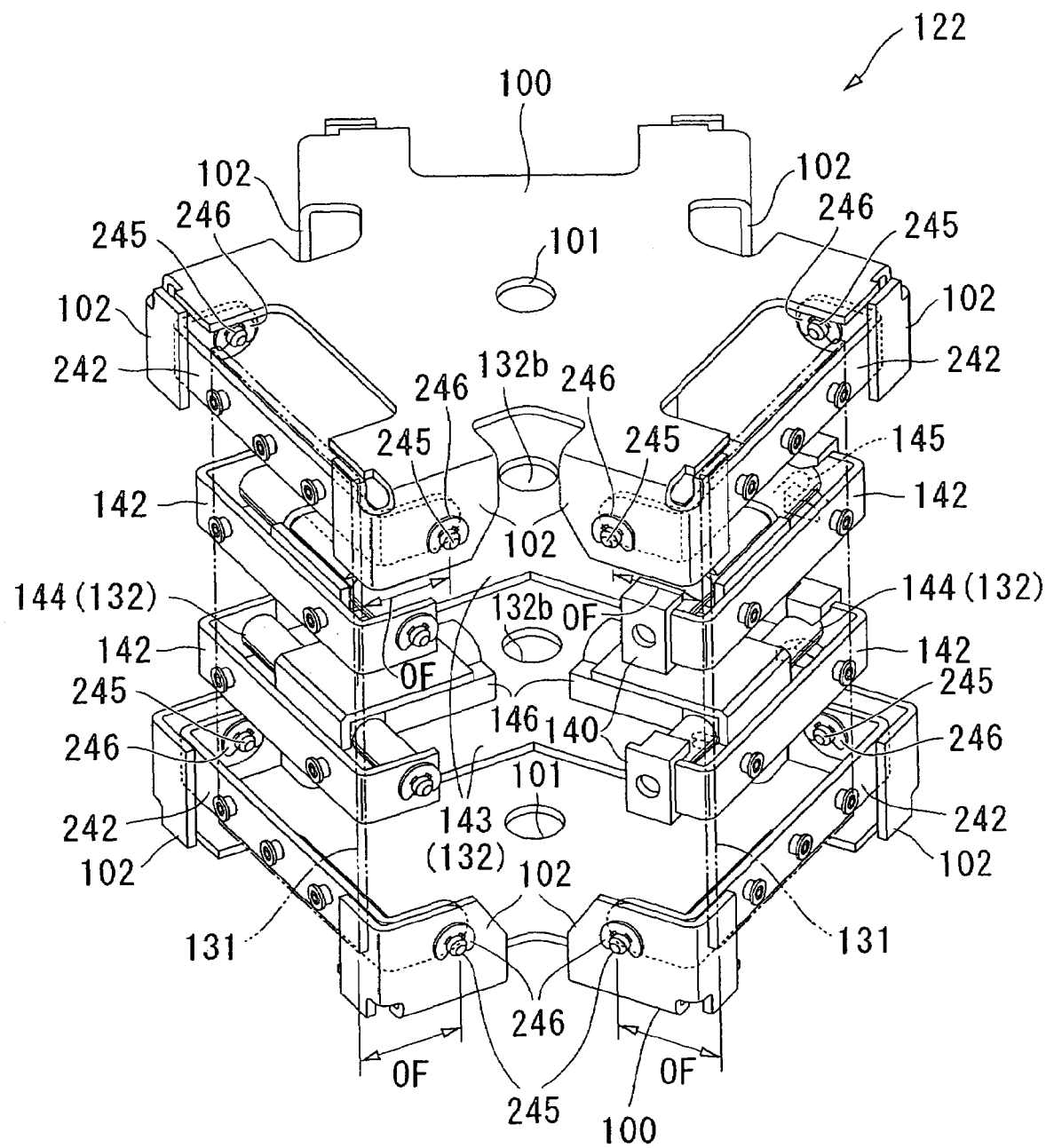
FIG. 10 is a perspective view of an apparatus for varying rigidity according to the second embodiment of this invention.
Figure 11:
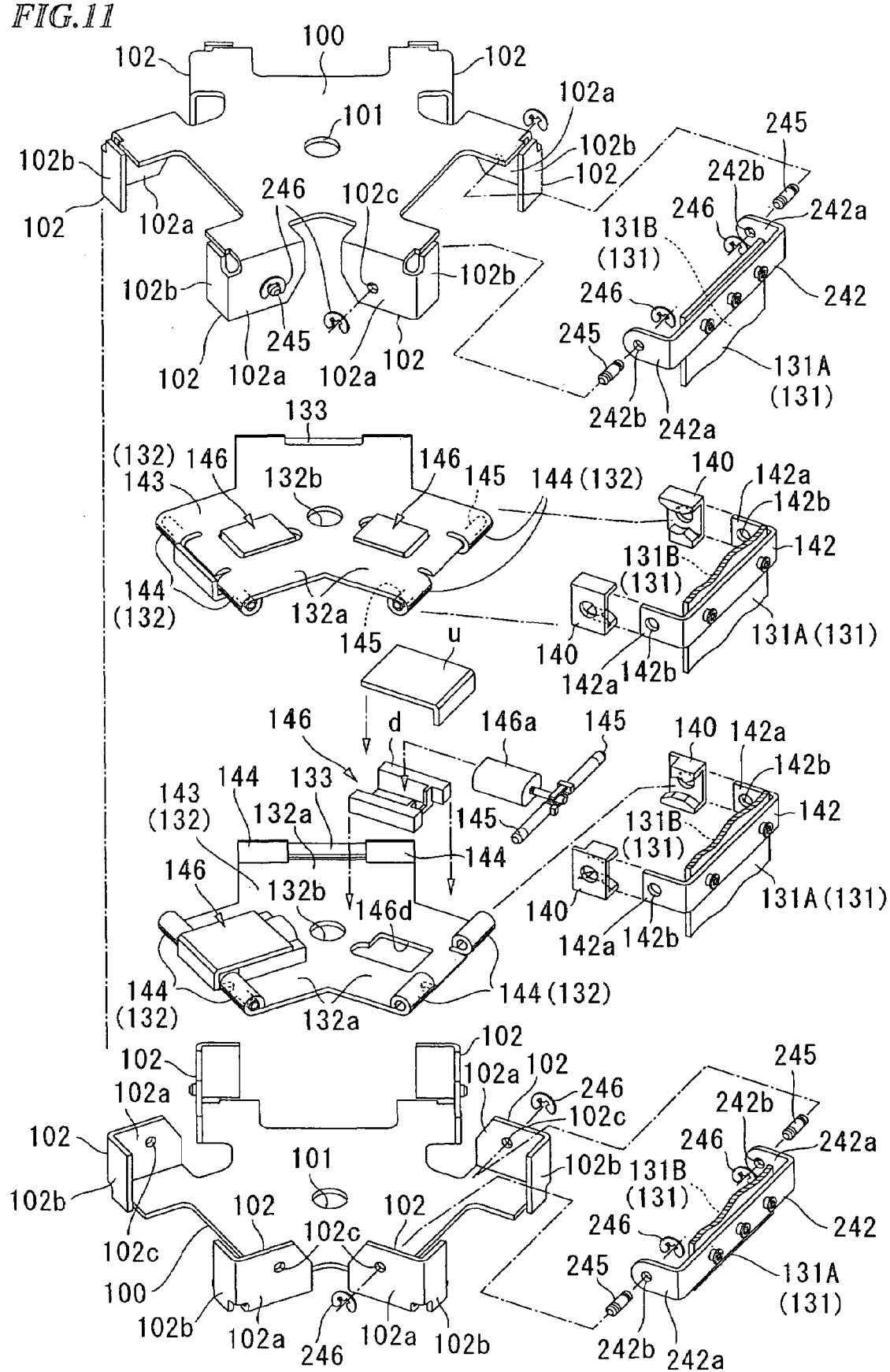
FIG. 11 is an exploded perspective view of the apparatus for varying rigidity shown in FIG. 10.

As shown in FIGS. 10 and 11, the apparatus for varying rigidity 122 is attached so that it is enclosed from each side in the vehicle front-rear direction by the pair of beam members 21 and 21 shown in FIGS. 3 and 4. The apparatus for varying rigidity 122 includes three plate-like members 131, 131, and 131, made from a shape-memory alloy and connected at both ends by a pair of brackets 100 and 100, and two connecting-disconnecting members 132 and 132 that are detachably connected to the plate-like members 131, the connecting-disconnecting members 132 being provided at predetermined positions along the longitudinal direction of respective plate-like members 131. Each connecting-disconnecting member 132 includes a base member 143 that connects to the plurality of plate-like members 131, 131, and 131, and can be disconnected therefrom, via a connecting member 142 fitted to each plate-like member 131, two pairs of pin guides 144, . . . , 144 and movable pin members 145, . . . , 145 fitted to the base member 143, and two actuators 146 and 146 that are controlled by an unillustrated controller.

Figure 12:
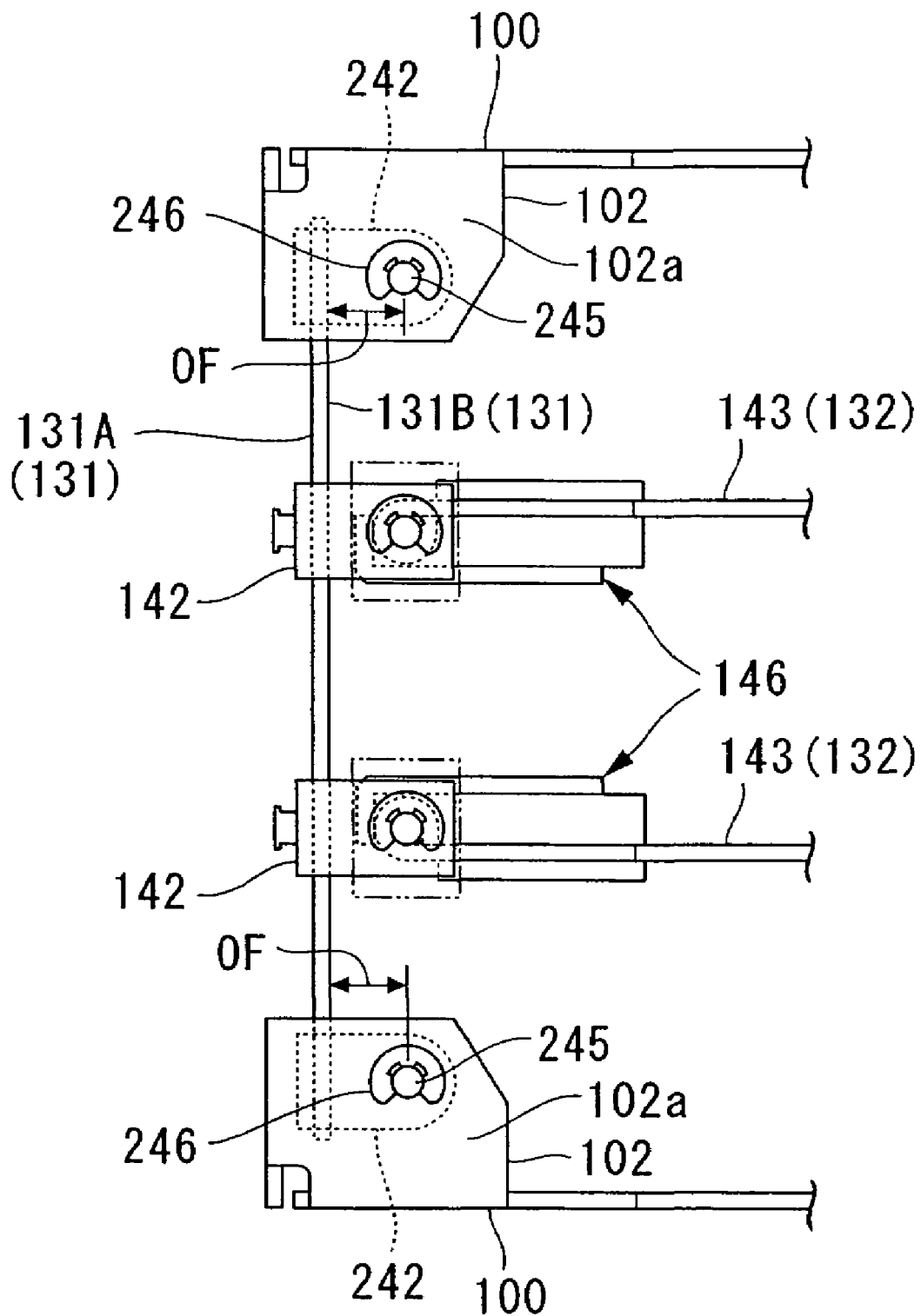
FIG. 12 is a partial side view of the second embodiment of this invention.
Figure 13:
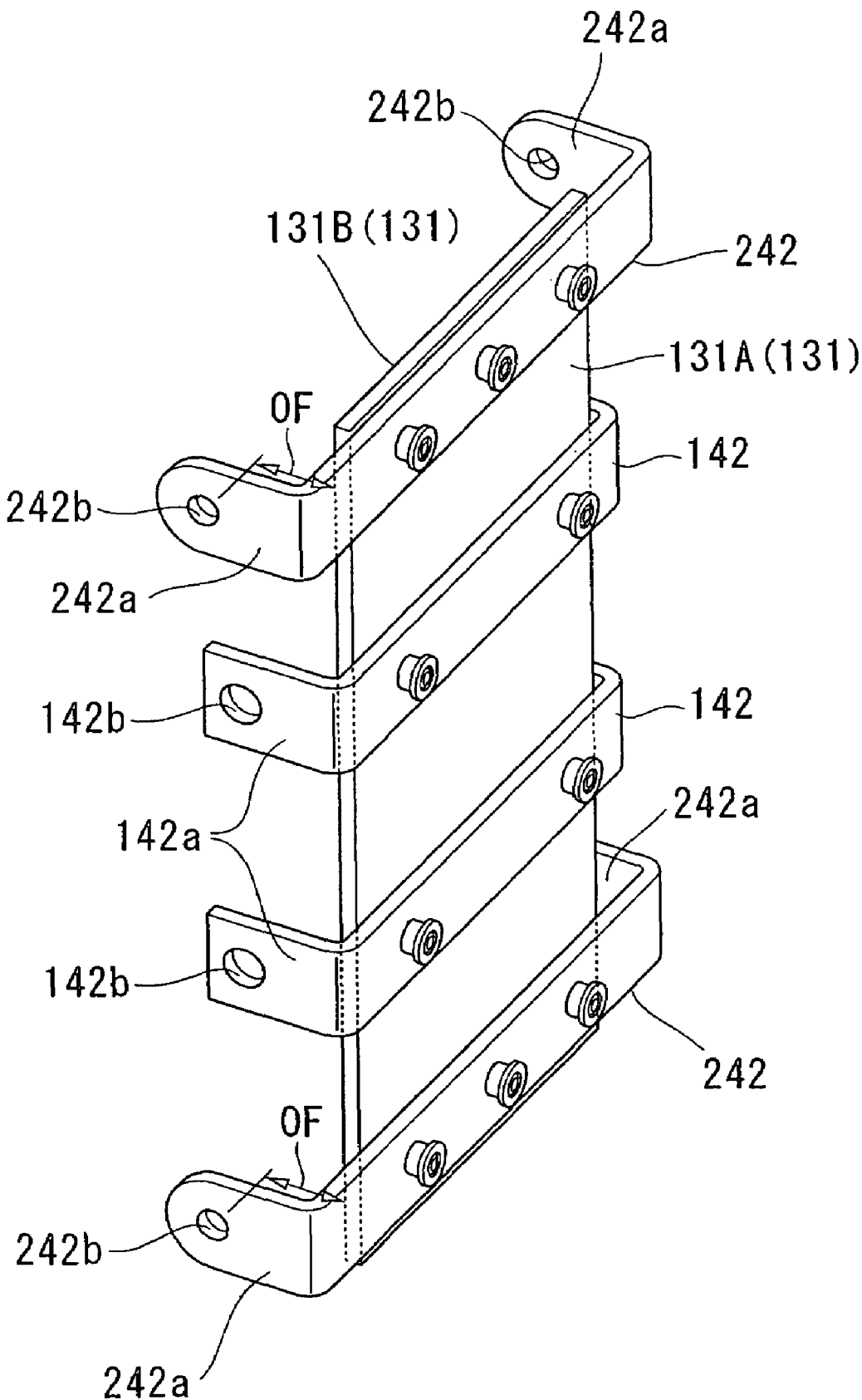
FIG. 13 is a perspective view centering on a plate-like member in the second embodiment of this invention.

As shown in FIGS. 12 and 13, each plate-like member 131 is fitted with two end connecting members 242 and 242 that are supported by the brackets 100 and 100, and two connecting members 142 and 142 that are supported by the connecting-disconnecting members 132. The connecting members 142 are attached so as to divide the distance between the end connecting members 242 at the ends into three approximately equal parts (see FIG. 12).

The end connecting members 242 are approximately C-shaped, their two ends 242a and 242a curving in the same direction. The end connecting members 242 are secured by bolts or the like to top faces 131A of the plate-like members 131, and their curved sides 242a and 242a protrude on the bottom faces 131B of the plate-like members 131.

Insertion holes 242b are formed in the ends 242a of the connecting members 242, enabling pins 245 to be inserted.

The connecting members 142 are approximately C-shaped, their two ends 142a and 142a curving in the same direction. The end connecting members 142 are secured by bolts or the like to top faces 131A of the plate-like members 131, and their curved sides 142a and 142a protrude on the bottom faces 131B of the plate-like members 131. Insertion holes 142b are formed in the ends 142a of the connecting members 142, enabling movable pin members 145 (explained later) to be inserted. Supporting pieces 140 are detachably attached to the ends 142a, and will be explained later. For sake of convenience, some of the supporting pieces 140 are omitted from FIG. 10 (the same goes for FIG. 21).

The bracket 100 are plate-like members, and have attachment holes (attachment units) 101 in their centers for securing them to the beam members 21 and 21. The bracket 100 is C-shaped at positions corresponding to the ends of the plate-like member 131, and a flange section formed in a cross-sectional L-shape is formed as a stopper 102 at both ends of the C-shaped section. The stopper 102 includes a side wall 102a that faces the side edge of the plate-like member 131, and a front wall 102b that covers the plate-like member 131 from its top face 131A. When the plate-like member 131 deforms in the buckling direction together with the stopper 102 of the bracket 100 connected to the other end of the plate-like member 131, the stoppers 102 of both brackets 100 directly contact each other, stopping the brackets 100 from moving any nearer and physically preventing the plate-like member 131 from buckling further.

Insertion holes (supporting sections) 102c for enabling insertion of pins 245 are formed in the side walls 102a, in correspondence with the insertion holes 242b in the ends 242a of the end connecting members 242 attached to the plate-like member 13. The insertion holes 102c are formed parallel to the out-of-plane direction of the plate-like member 131 and facing inwards at positions deviating by an offset amount OF with respect to installation position of the plate-like member 131 (the same goes for the insertion holes 242b in the end connecting members 242). C-rings 246 are secured so that the pins 245 cannot slip through.

Each connecting-disconnecting member 132 has three protrusions 132a at positions corresponding to the plate-like members 131 of the base member 143, each protrusion 132a having cylindrical pin guides 144 on both sides. An installation hole 132b is formed in the center of each connecting-disconnecting member 132 at a position corresponding to the installation hole 101A in the bracket 100. Openings 146d are formed in two of the protrusions 132a of the connecting-disconnecting member 132, and allow motors 146a of the actuators 146 to be attached while being enclosed on each side by a bottom case d and a top case u (omitted in FIG. 14). The movable pin members 145 and 145 are moved by rotational motion that is input from the motors 146a, and can be inserted into the pin guides 144 and 144. The movable pin members 145 and 145 are supported by the connecting-disconnecting members 132 in such a manner that they can move and can be disconnected from the two connecting members 142 attached to the plate-like member 131.

A pin 133 is inserted through the pin guide 144 of the remaining protrusion 132a, and is supported in such a manner that cannot be disconnected from one of the connecting members 142 attached to the plate-like member 131 while being able to rotate. The top case u seals a section where rack axes 146c and 146c interlock with a pinion 146b (explained below).

In the connecting-disconnecting member 132 at the top of FIG. 11, the positions for forming the pin guides 144 are on the bottom side; in the connecting-disconnecting member 132 at the bottom of FIG. 11, the positions for forming the pin guides 144 are on the top side. The top and bottom sides here correspond to the front and rear sides of the vehicle; the expressions "top side" and "bottom side" are used in FIG. 11 and the like merely for the sake of convenience. In the connecting-disconnecting member 132 at the top, the motors 146a, the top case u, and the bottom case d, are attached from the bottom side, while those on the connecting-disconnecting member 132 at the bottom are attached from the top side. Consequently, the pin guides 144 of the connecting-disconnecting members 132 face each other from opposite sides. The actuators 146 and the like are fitted when the top and bottom connecting-disconnecting members 132 are aligned in the top-bottom direction.

Figure 14:
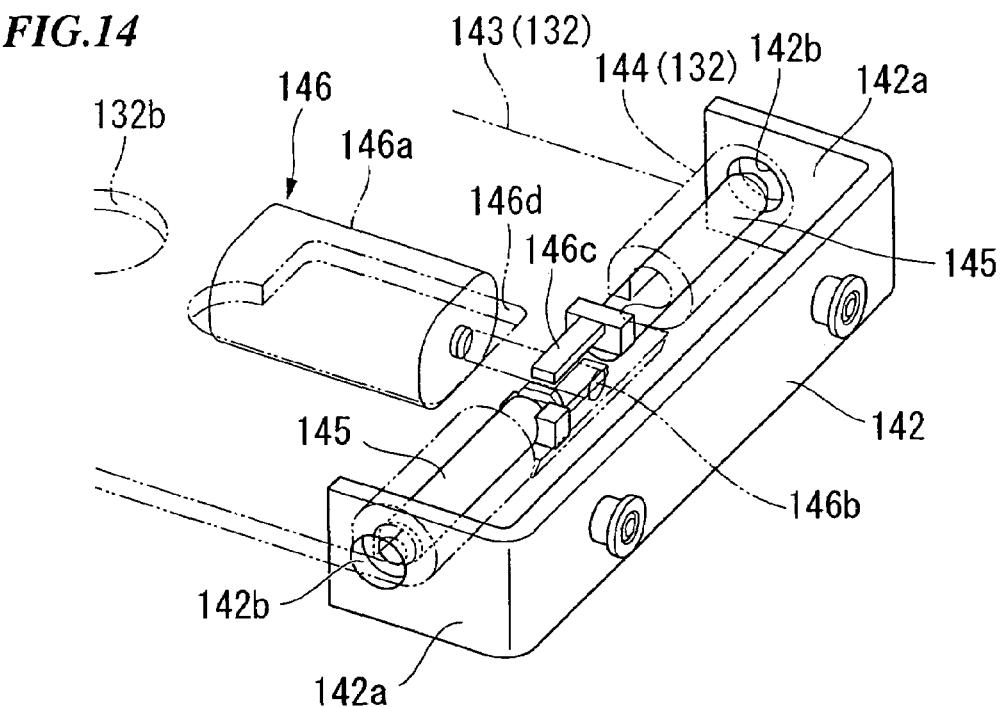
FIG. 14 is a perspective view of the vicinity of an actuator in the second embodiment of this invention.
Figure 15:
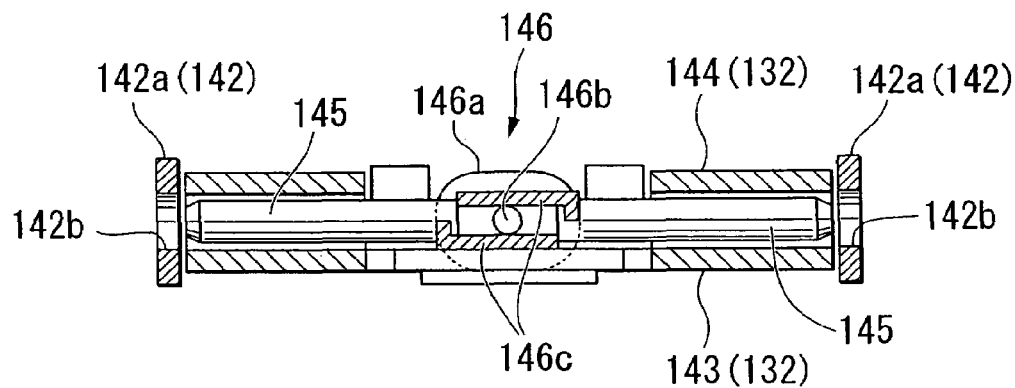
FIG. 15 is a side view to explain operating conditions of the actuator shown in FIG. 14.
Figure 16:
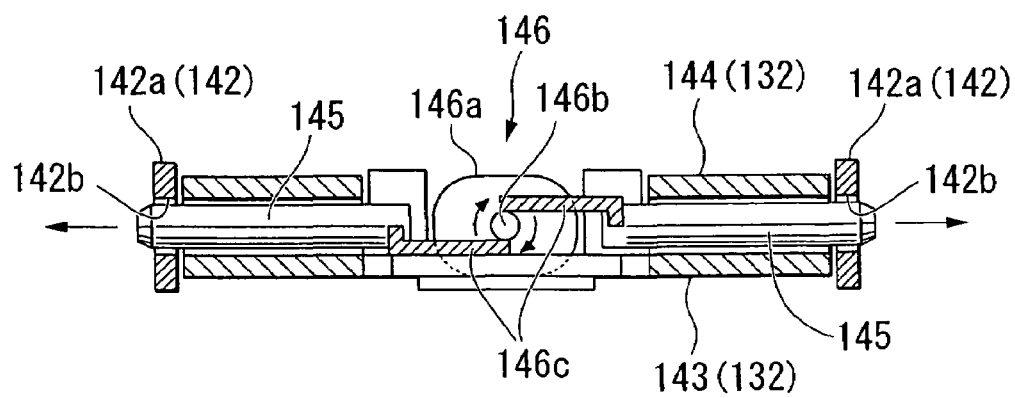
FIG. 16 is a side view to explain operating conditions of the actuator shown in FIG. 14.

As shown in FIGS. 14 to 16, the actuators 146 have the same configuration as the actuators 46 described in the first embodiment. Each actuator 46 is driven by a rack pinion mechanism that makes the movable pin members 145 and 145 protrude from the pin guides 144 and 144 to the outside as indicated by arrows in FIG. 16, so that they clip into the insertion holes 142b in the connecting members 142 and 142 while being able to rotate therein; alternatively, the movable pin members 145 and 145 are buried in the pin guides 144 and 144 and kept back from the insertion holes 142b in the ends 142a of the connecting members 142 as shown in FIG. 15. A pinion 146b connects to a rotational axis of a motor 146a that is drive-controlled by an unillustrated controller, and interlocks with the rack-teeth of rack axes 146c and 146c. The rotational motion input from the motor 146a is converted via the pinion 146b to a forward-backward motion of the rack axes 146c and 146c, propelling the movable pin members 145 and 145 connected to both ends of the rack axes 146c and 146c forward along the pin guides 144 and 144.

As shown in FIGS. 17 to 20, a supporting piece 140 is detachably attached to each end 142a and 142a of the connecting member 142. The connecting member 142 supported by the connecting-disconnecting member 132 at the bottom side of FIG. 18 will be explained by way of example. The supporting piece 140 is a member made of resin, and includes an outer wall 140a that runs along the outside wall of the end 142a, and a top holder 140b and a bottom holder 140c that are formed on the top and bottom edges of the outer wall 140a and respectively hold the top edge and bottom edge of the end 142a. A slit 140d is formed at the root joint between the top holder 140b and the bottom holder 140c. The supporting piece 140 is attached to the connecting member 142 so that the end 142a is accommodated in the slit 140d. A hole 140e is formed in the outer wall 140a, and slightly accommodates the tips of the movable pin members 145 and 145 when they are inserted into the ends 142a.

The outer peripheral faces of the pin guides 144 of the connecting-disconnecting member 132 possess a certain degree of provisional holding force, and are rotatably supported between the top holder 140b and the bottom holder 140c. Arched sections 140f are formed in the top holders 140b and conform to the outer peripheral faces of the pin guides 144. A notch 140g is formed in each top holder 140b. When changing from the state prior to deformation shown in FIG. 19 to that shown in FIG. 20, where the plate-like member 131 buckles in tertiary mode formation and the center section of the plate-like member 131 in its top-bottom direction becomes inwardly indented, the supporting pieces 140 unite with the plate-like member 131 (connecting members 142) and avoid interference with the connecting-disconnecting members 132. The notches 140g permit relative motion of the connecting-disconnecting members 132 with respect to the connecting members 142. A rotation restrictor 140i is formed on the side face of each notch 140g, and directly contacts the connecting-disconnecting member 132 when the supporting piece 140 attached to the connecting member 142 of the plate-like member 131 has rotated by a predetermined angle with respect to the connecting-disconnecting member 132. A supporting face 140h is formed on the bottom holder 140c, and corresponds to the arched section 140f of the top holder 140b.

In other words, when the movable pin member 145 provided between the connecting-disconnecting member 132 and the connecting member 142 is not inserted into the insertion hole 142b in the end 142a of the connecting member 142, the supporting piece 140 provisionally holds the connecting-disconnecting member 132 against the connecting member 142 in a state that permits the connecting-disconnecting member 132 to rotate with respect to the connecting member 142. Also, when the movable pin member 145 is inserted into the insertion hole 142b in the end 142a of the connecting member 142, the plate-like member 131 is restricted from moving at the time of tertiary mode deformation.

Figure 17:
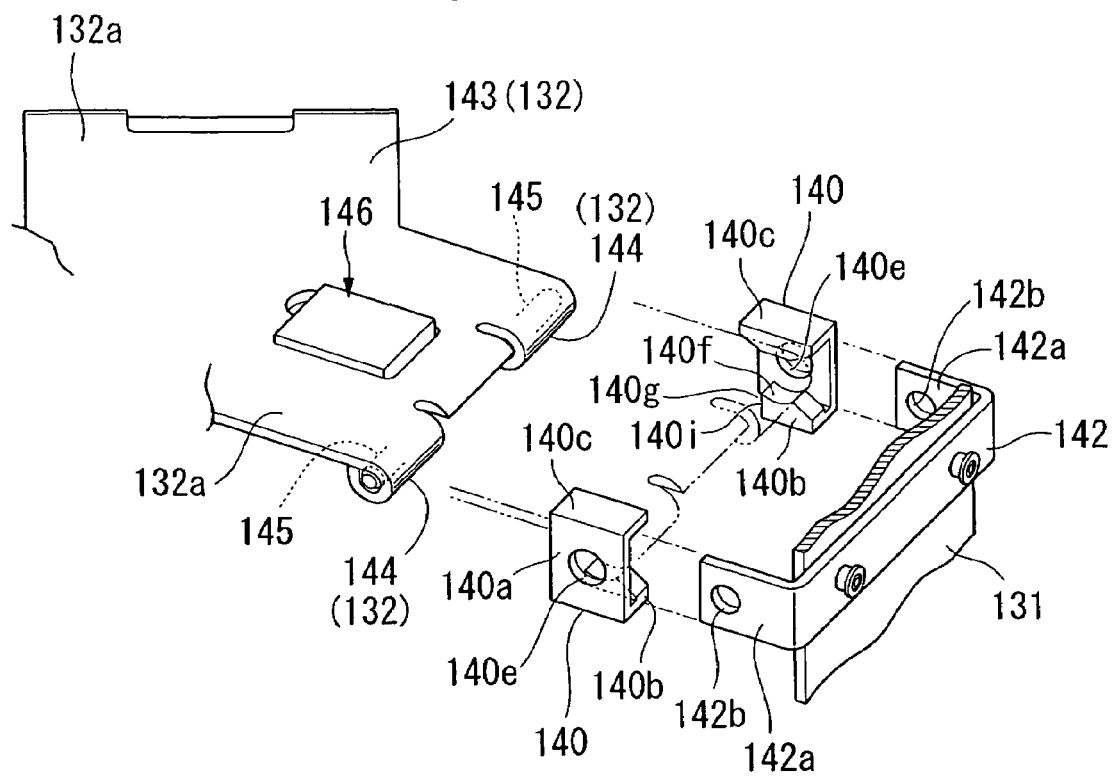
FIG. 17 is a perspective view of the vicinity of a supporting piece of a top-side connecting-disconnecting member in the second embodiment.
Figure 18:
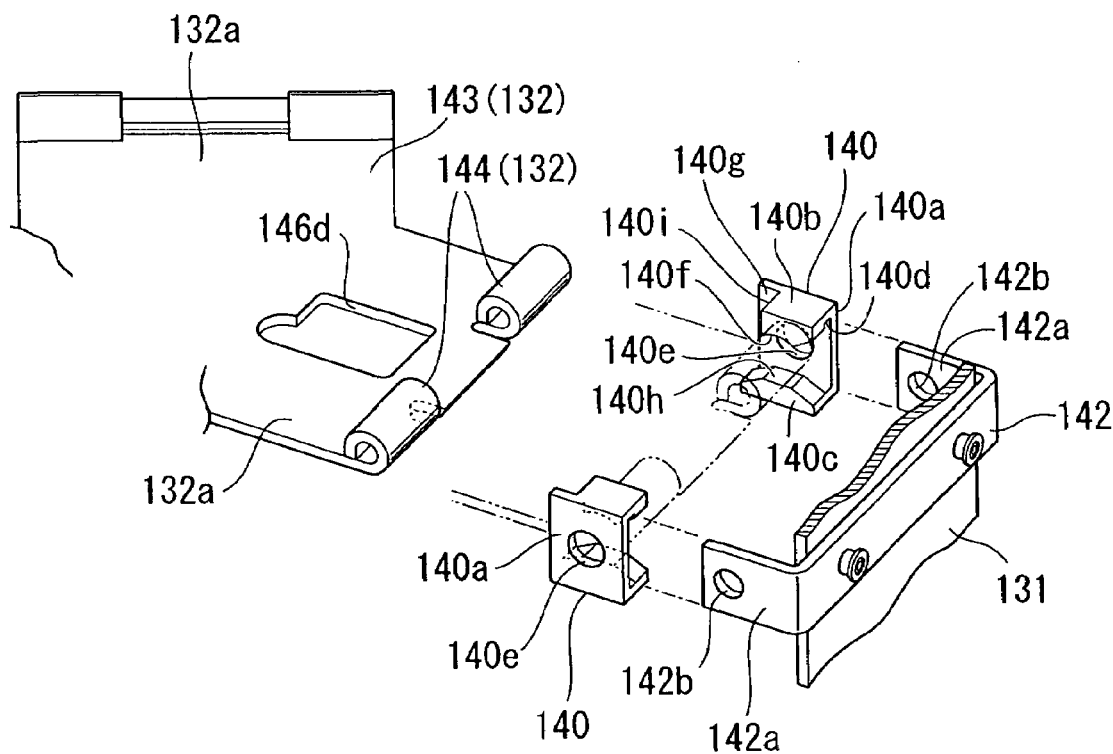
FIG. 18 is a perspective view of the vicinity of a supporting piece of a bottom-side connecting-disconnecting member in the second embodiment.

While the supporting pieces 140 of FIG. 18 are attached to the connecting-disconnecting member 132 at the top side as shown in FIG. 17, the pin guides 144 of the top-side connecting-disconnecting member 132 are at the bottom side, so that the supporting pieces 140 are attached to the top-side connecting-disconnecting member 132 with top and bottom facing in opposite directions. Accordingly, in FIG. 17, the same parts as those in FIG. 18 are represented by reference numerals and will not be explained further.

Figure 19:
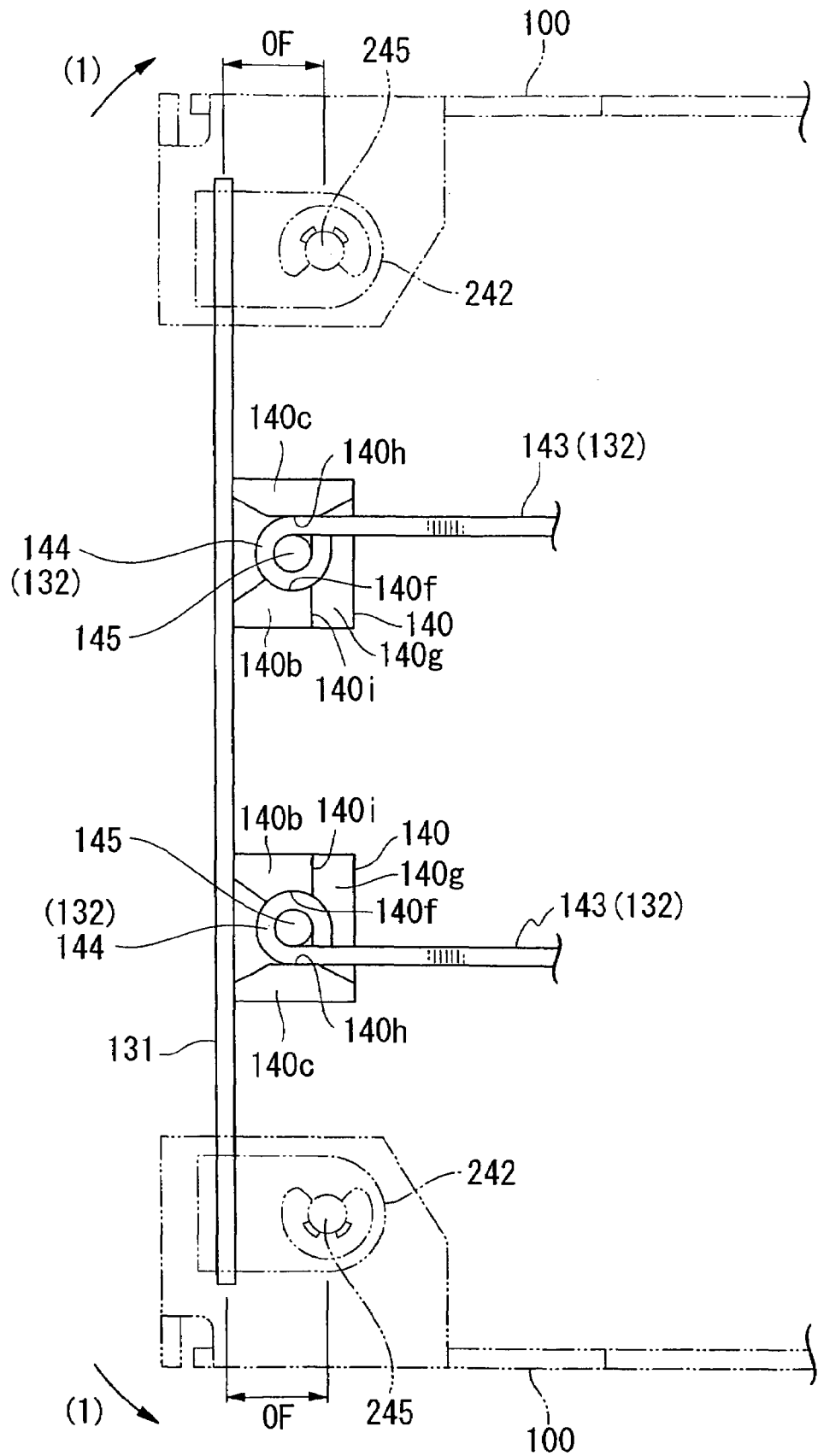
FIG. 19 is a diagram of a connecting-disconnecting member prior to deformation in the second embodiment.
Figure 20:
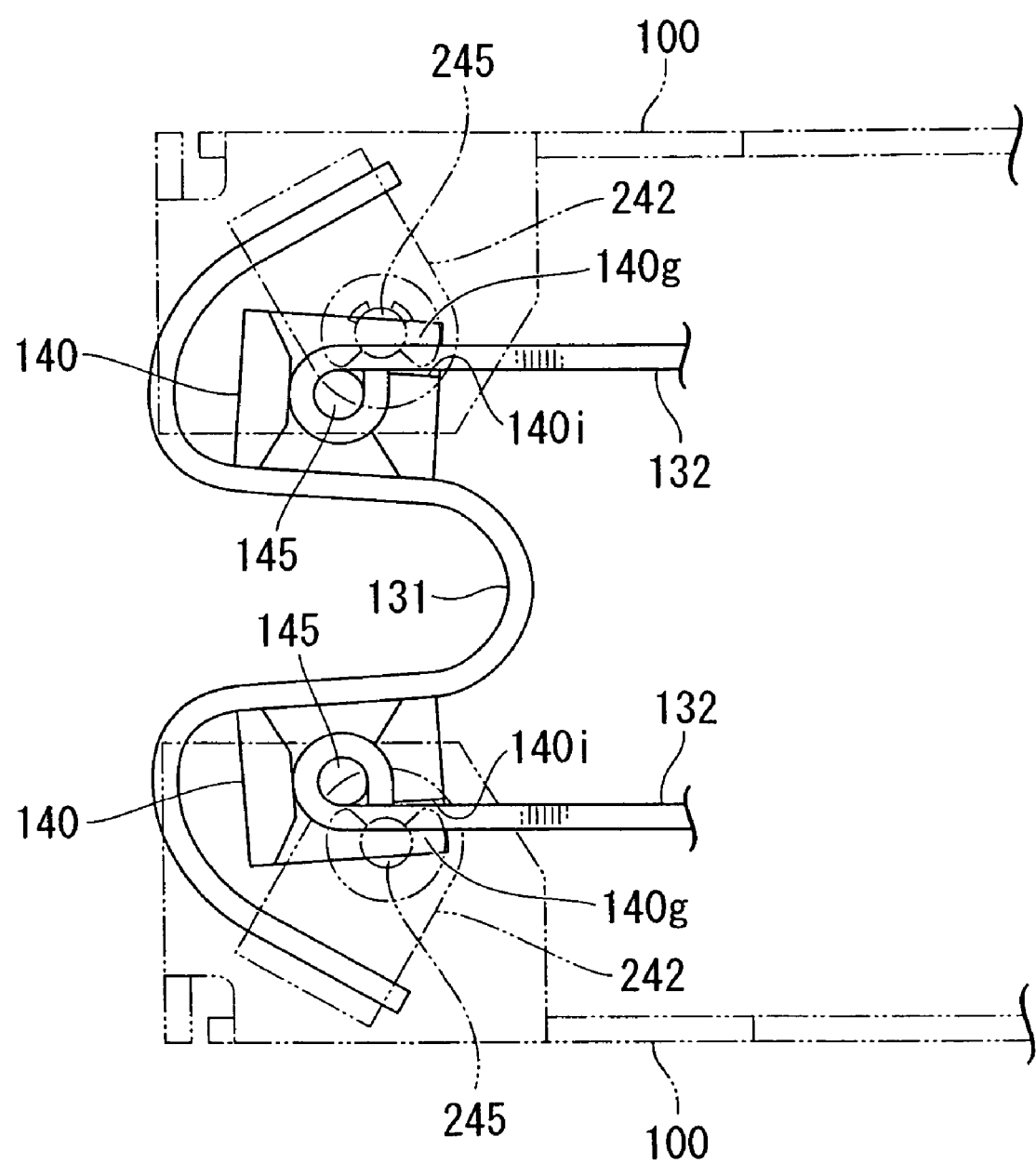
FIG. 20 is a diagram of a connecting-disconnecting member after deformation in the second embodiment.

Therefore, in FIG. 19 and 20, taking one plate-like member 131 as an example, when a collision load is applied from the top side, the top and bottom sides of the plate-like member 131 receive inwardly rotating moment as indicated by arrows (1) in FIG. 19 due to the offset OF mentioned earlier. Consequently, as shown in FIG. 20, the section of the plate-like member 131 that is above the top-side connecting member 142 deforms to an indentation on the left, while the section of the plate-like member 131 that is enclosed by top-side and bottom-side connecting members 142 deforms to a right-facing indentation. Similarly, the section of the plate-like member 131 that is below the bottom-side connecting member 142 deforms to a left-facing indentation. The notches 140g provided in the supporting pieces 140 ensure that they do not affect the rotation of the connecting members 142 and the plate-like member 131.

Since the rotation restrictors 140i of the supporting pieces 140 restrict rotation of the plate-like member 131 due to bending deformation from exceeding a predetermined amount, breakage of the plate-like member 131 can be prevented. This prevents components such as the front bumper beam 10 from becoming detached.

According to the second embodiment described above, in addition to the first embodiment described earlier, the movable pins 145 of the top-side and bottom-side connecting-disconnecting member 132 can move with respect to the insertion holes 142b in the ends 142a that they are inserted into. This structure permits the plate-like member 131 to rotate with respect to the connecting-disconnecting members 132 when the plate-like member 131 deforms, and thereby prevents deformation of the connecting-disconnecting members 132. Therefore, the buckling load of the plate-like member 131 can be adequately maintained without deformation of the connecting-disconnecting members 132.

The supporting piece 140 is provided between the connecting-disconnecting member 132 and the connecting member 142, and, when the movable pin member 145 is not inserted into the insertion hole 142b of the connecting member 142, the supporting piece 140 provisionally holds the connecting-disconnecting member 132 against the connecting member 142 in a state that permits the connecting member 142 to rotate with respect to the connecting-disconnecting member 132. This structure ensures that, when the movable pin member 145 is not inserted into the insertion hole 142b of the connecting member 142, the supporting piece 140 provisionally holds the connecting-disconnecting member 132 against the connecting member 142, preventing the connecting-disconnecting member 132 from becoming detached from the connecting member 142. Even when the movable pin 145 functions and then returns to a state where it is not reinserted into the insertion hole 142b after its previous insertion, the rigidity adjusting function is not damaged by the connecting-disconnecting member 132 becoming detached from the connecting member 142 and 142.

The brackets 100 are provided to support the ends of the three plate-like member 131 via the end connecting members 242, and insertion holes 242b support the brackets 100 so that they can rotate with respect to the end connecting member 242 with the wide direction of the plate-like member 131 as an axis, while permitting bending deformation of the plate-like member 131 in the out-of-plane direction. By permitting the ends of the plate-like member 131 to rotate, it is possible to avoid a high load being generated by bend restraint stiffness of the ends during buckling deformation that is caused by compression of the plate-like member 131, enabling buckling deformation to start at low load.

Figure 21:
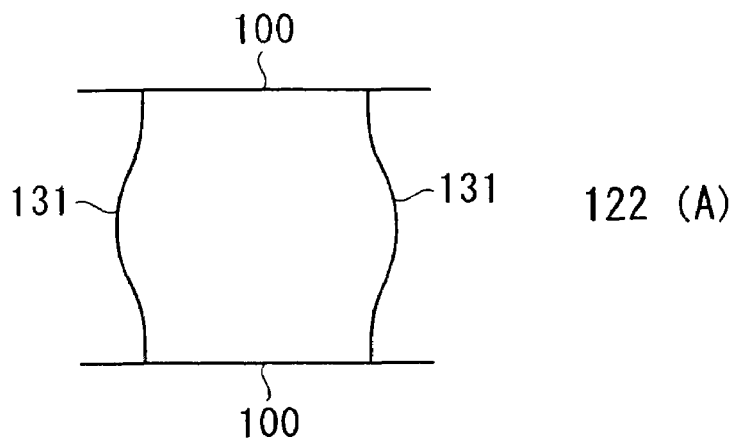
FIG. 21 is a schematic view of primary mode deformation when ends of a plate-like member are secured.
Figure 22:
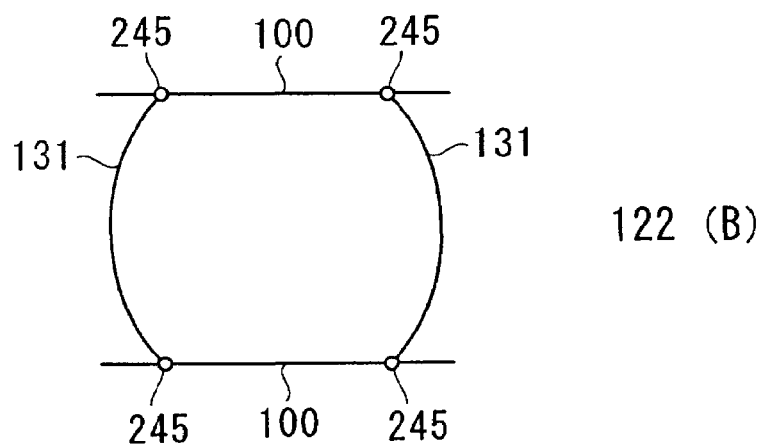
FIG. 22 is a schematic view of primary mode deformation when ends of a plate-like member are supported by pins.

High load generated from bend stiffness of the ends will be explained based on FIGS. 21 to 23. FIGS. 21 and 22 are schematic view of apparatuses for varying rigidity 122 that a load is applied to. FIG. 21 depicts deformation of apparatus for varying rigidity 122 (A) that has high bend restraint stiffness, since the top and bottom ends of a pair of plate-like members 131 are secured to brackets 100. FIG. 22 depicts deformation of apparatus for varying rigidity 122 (B) that has extremely low bend restraint stiffness, since the top and bottom ends of the pair of plate-like members 131 are rotatably supported in brackets 100 by pins 245.

In the apparatus for varying rigidity 122 (B), since the plate-like members 131 are rotatably supported by the pins 245, the plate-like members 131 deform so that their centers in the top-bottom direction bulge considerably to the outer sides.

Figure 23:
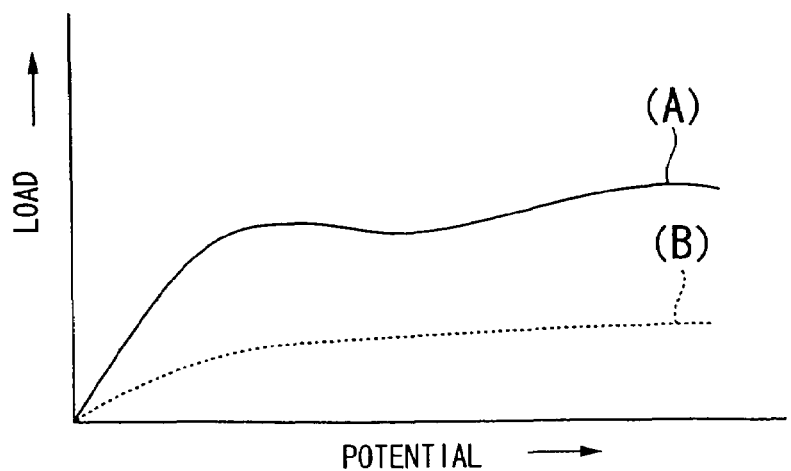
FIG. 23 is a graph of changes in potential with respect to the loads in FIGS. 22 and 23.

Therefore, as shown in FIG. 23 as changes in potential with respect to load, the load of the apparatus for varying rigidity 122 (B) is greatly reduced in comparison with the load of the apparatus for varying rigidity 122 (A). As a result, the primary mode deformation load of the apparatus for varying rigidity 122 decreases, achieving a large difference in load and energy with the tertiary mode deformation load.

The insertion holes 242b are formed facing parallel to the out-of-plane direction of the plate-like members 131 and maintain an offset amount OF from them. This structure deviates the input point of a collision load with respect to the plate-like members 131, applying a reasonable bend moment to the plate-like member 131 during buckling deformation. Therefore, even when there is a high-speed collision, the centers of the plate-like members 131 in their longitudinal direction buckle in primary mode deformation, in which they deform in a direction that is substantially perpendicular to the collision load without being affected by cohesive force, enabling a low load to be output.

Furthermore, providing attachment holes 101 for the beam members 21 in the brackets 100 at the ends of each plate-like member 131 enables the plate-like members 131 to be attached to the beam members 21 via the brackets 100, making them easier to position than when attached to each beam member 21 and reducing the number of assembly processes.

Each bracket 100 is fitted with a stopper 102 that, when the plate-like member 131 deforms in the buckling direction, directly contacts the other bracket 100 and restricts it from moving nearer. Even when the load is so large that the plate-like member 131 will exceed its maximum warping and break, the stoppers 102 of the brackets 100 can prevent this. The plate-like member 131 is thereby prevented from breaking, and noise generated by breakage of the plate-like member 131, and detachment or damage of the connecting-disconnecting members 132, can also be prevented. While the second embodiment describes a case where stoppers 102 are fitted to both brackets 100, stoppers 102 need only be provided to at least one of the brackets 100 provided that breakage of the plate-like member 131 can be prevented.

Subsequently, a third embodiment of this invention will be explained based on FIGS. 24 to 26 while quoting from the first embodiment shown in FIGS. 1 and 2. Parts that are the same as those in the second embodiment are represented by the same reference numerals.

Figure 24:
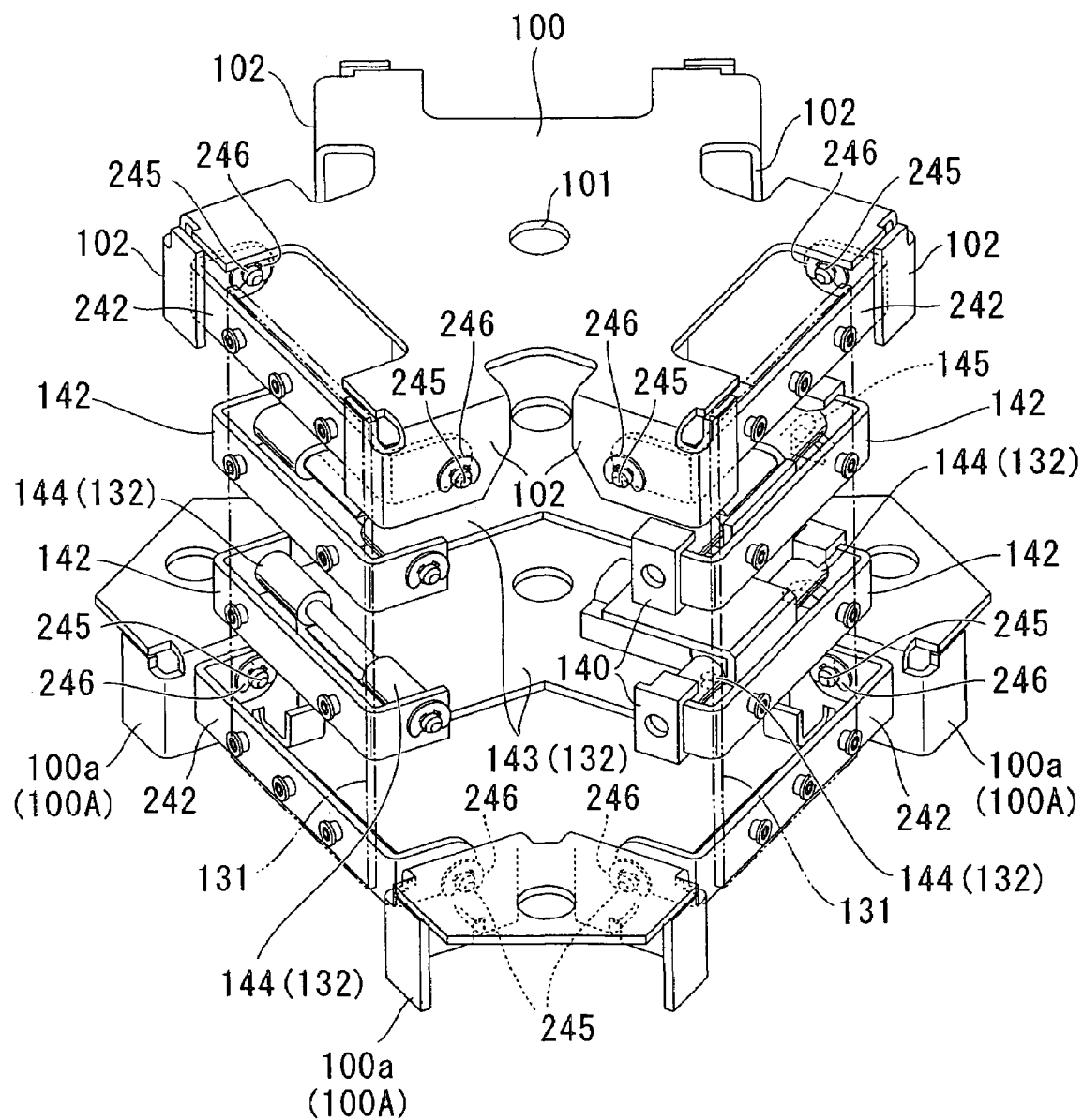
FIG. 24 is a perspective view of an apparatus for varying rigidity according to the third embodiment of this invention.

In FIG. 24, the apparatus for varying rigidity 122 includes three plate-like members 131, 131, and 131, that are made from a shape-memory alloy and connected at both ends by a pair of brackets 100 and 100 via end connecting members, and two connecting-disconnecting members 132 and 132 that are detachably connected to the plate-like members 131, the connecting-disconnecting members 132 being provided at predetermined positions along the longitudinal direction of respective plate-like members 131. The connecting-disconnecting member 132 have the same basic configuration as those in the second embodiment, each including a base member 143 that connects to the plurality of plate-like members 131, 131, and 131, and can be disconnected therefrom, via a connecting member 142 fitted to each plate-like member 131, two pairs of pin guides 144, . . . , 144 and movable pin members 145, . . . , 145 fitted to the base member 143, and two actuators 146 and 146 that are controlled by an unillustrated controller.

Figure 25:
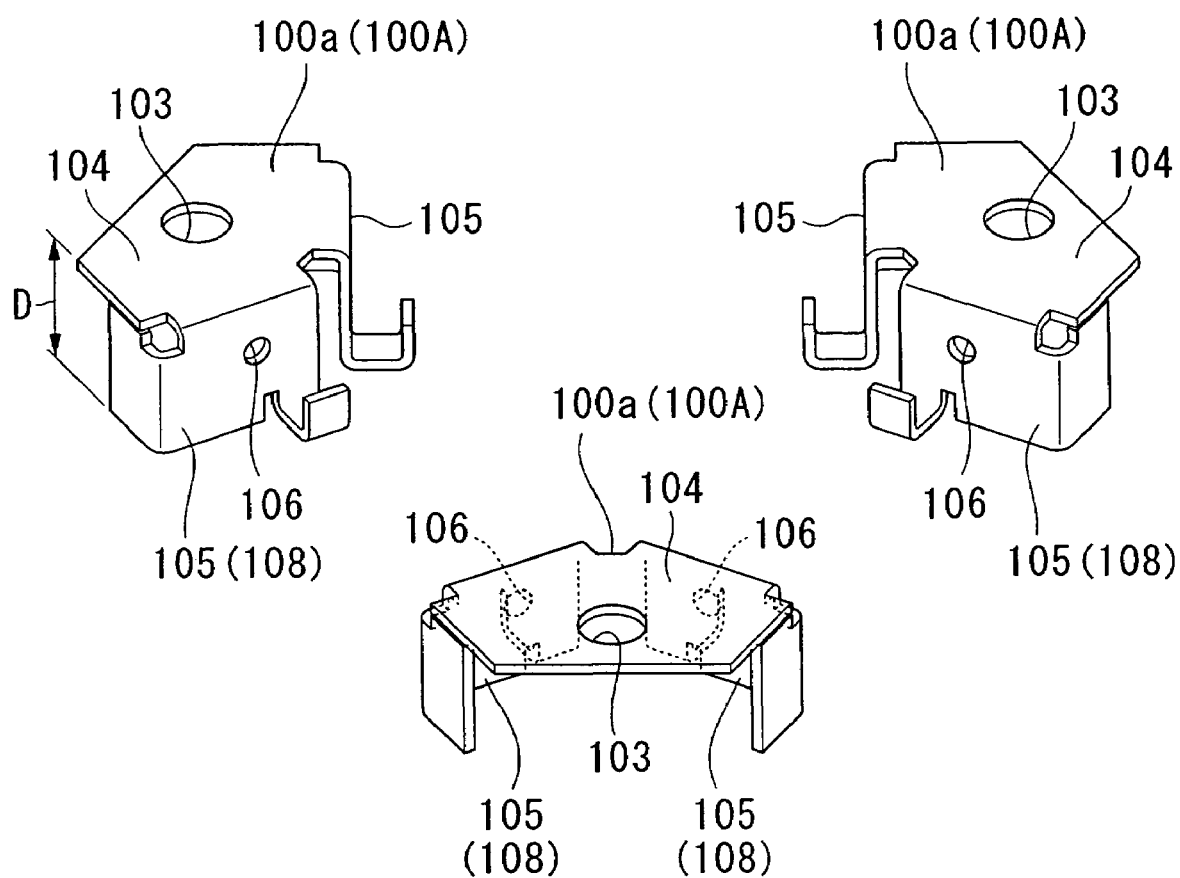
FIG. 25 is a perspective view of a main part of the third embodiment of this invention.
Figure 26:
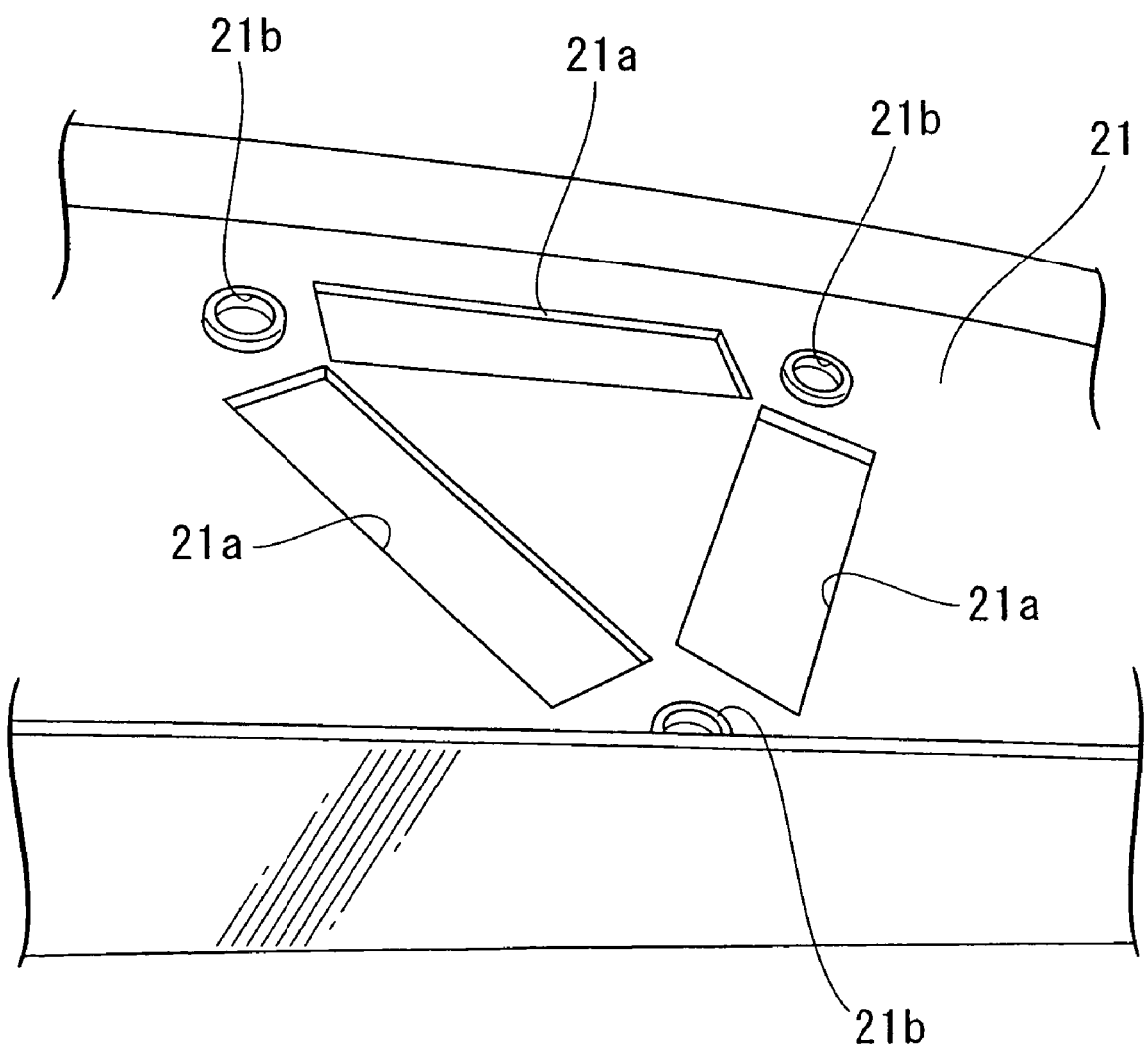
FIG. 26 is a perspective view of a beam member of the third embodiment of this invention.

In this embodiment, of the brackets 100 that support the ends of the plate-like member 131, bracket 100A at the bottom side of FIG. 24 is divided into bracket pieces 100a, 100a, and 100a, as shown in FIG. 25.

In each bracket piece 100a, the inside edge of an attachment washer 104 having an attachment hole 103 for attaching to the beam member 21 is folded downwards to form two side walls 105 and 105, and an insertion hole 106 for enabling insertion of a pin 245 is formed in each side wall 105 in correspondence with the insertion hole 242b in the end connecting member 242 attached to the plate-like member 131.

Between the side walls 105 of adjacent bracket pieces 100a, the pins 245 support the end connecting member 242 that is rotatably supported at the ends of the plate-like member 131. In other words, by supporting the ends 242a of the end connecting members 242 attached to plate-like member 131 adjacent to each of the three bracket pieces 100a, the same effects are achieved as when the plate-like member 131 is supported by a single undivided bracket 100.

Each side wall 105 of the bracket pieces 100a configured in this way is flipped downward a distance D from the attachment washer 104, forming a protrusion 108 that protrudes toward the beam member 21 on the bracket 100A comprising the three bracket pieces 100a. As shown in FIG. 26, three rectangular holes (hole sections) 21a having a depth of D are formed in the beam member 21 in a triangular formation so as to accommodate the protrusions 108 (i.e. the side walls 105). Attachment holes 21b are then formed between the ends of adjacent rectangular holes 21a, and unillustrated bolts are inserted into the attachment holes 103 in the attachment washers 104 of the bracket pieces 100a and secured.

Since the stopper 102 of the top-side bracket 100A can perform a stopping function by directly contacting the attachment washers 104 of the bracket pieces 100a, its stopping function is unaffected by dividing the bottom-side bracket 100A into three bracket pieces 100a. Incidentally, while this embodiment describes an example where only the bottom-side bracket 100A is divided into three bracket pieces 100a, the top-side bracket 100A may also be divided into three bracket pieces 100a.

According to this embodiment, the protrusion 108 is formed on the bottom-side bracket 100A and protrudes towards the beam member 21, and, when the protrusion 108 is stored in the rectangular hole 21a that corresponds to the beam member 21, the bracket 100A can be attached to the beam member 21. Therefore, the ends of the plate-like member 131 can be stored in the rectangular holes 21a, preventing them from being exposed to the outside. This protects them from damage caused by rebounding gravel and the like, and ensures that their rigidity-varying function is not adversely affected by intrusion of garbage and the like. The overall attachment length is shorter, being no greater than the flip-over distance D of the side walls, enabling the structure to be made smaller and reducing installation space.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An apparatus for adjusting the rigidity of vehicle body, comprising:
    a plurality of plate-like members that a collision load is applied to, said plate members being arranged substantially parallel to a direction of said collision load;
    connecting-disconnecting members that are provided at predetermined positions of each of said plurality of plate members; and
    connecting members, said connecting members being fitted to said plate members and detachably connect said plate members to said connecting-disconnecting members.

2. The apparatus according to claim 1, wherein movable pin members are fitted to said connecting-disconnecting members, and insertion holes that enable insertion of said movable pin members are provided in said connecting members attached to said plate members.

3. The apparatus according to claim 2, wherein each of said connecting-disconnecting member includes said movable pin member, an actuator that drives said movable pin member, and a base member for mounting said movable pin member and said actuator.

4. The apparatus according to claim 2, wherein said movable pin members of said connecting-disconnecting members can rotate with respect to said insertion holes in said connecting members when inserted therein.

5. The apparatus according to claim 2, further comprising a supporting piece that is provided between said connecting-disconnecting member and said connecting member, and, when said movable pin member is not inserted into said insertion hole in said connecting member, provisionally holds said connecting-disconnecting member against said connecting member in a state that permits said connecting member to rotate with respect to said connecting-disconnecting member.

6. The apparatus according to claim 1, wherein each end of said plurality of plate members has a supporter that rotatably supports it with respect to a vehicle body member with the wide direction of said plate member as its axis in order to permit bending deformation toward the out-of-plane direction of said plate member.

7. The apparatus according to claim 6, wherein said supporter is offset from said plate-like member and faces in a direction parallel to said out-of-plane direction of said plate member.

8. The apparatus according to claim 7, further comprising brackets that are provided on both sides of each of said plate member and restrict at least adjacent said plate members at their respective supporters, each of said bracket being fitted with an attachment unit for attaching to said vehicle member.

9. The apparatus according to claim 8, further comprising a stopper that is fitted to at least one of said brackets provided on both sides of said plate member, and, when said plate member deforms in the buckling direction, directly contacts the other bracket and restricts said brackets from moving nearer to each other.

10. The apparatus according to claim 8, further comprising a protrusion that is formed on at least one of said brackets and protrudes to said vehicle member side, said brackets being possible to attach to said vehicle member when said protrusion is stored in a hole formed at a corresponding position in said vehicle member.

11. The apparatus according to claim 1, wherein said plate members comprise a shape-memory alloy.

* * * * *

UNITED STATES PATENT AND TRADEMARK OFFICE
CERTIFICATE OF CORRECTION

PATENT NO. : 7,195,305 B2 Page 1 of 1
APPLICATION NO. : 11/134895
DATED : March 27, 2007
INVENTOR(S) : Urushiyama et al.

It is certified that error appears in the above-identified patent and that said Letters Patent is hereby corrected as shown below:

Column 14, Line 42, (Claim 1, Line 3), delete "plate-like" and insert --plate--.

Signed and Sealed this

Eighth Day of May, 2007

JON W. DUDAS
*Director of the United States Patent and Trademark Office*